US010557015B2

(12) United States Patent
Piestert et al.

(10) Patent No.: US 10,557,015 B2
(45) Date of Patent: *Feb. 11, 2020

(54) EPOXY RESIN-EPOXY CURING SYSTEMS WITH A LATENT THICKENING TENDENCY

(71) Applicant: BYK-Chemie, GmbH, Wesel (DE)

(72) Inventors: Frederik Piestert, Wesel (DE); Wolfgang Pritschins, Wesel (DE); Sascha Kockoth, Stuttgart (DE); Jürgen Omeis, Dorsten-Lembeck (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/320,517

(22) PCT Filed: Jun. 23, 2015

(86) PCT No.: PCT/EP2015/064153
§ 371 (c)(1),
(2) Date: Dec. 20, 2016

(87) PCT Pub. No.: WO2015/197647
PCT Pub. Date: Dec. 30, 2015

(65) Prior Publication Data
US 2017/0226313 A1    Aug. 10, 2017

(30) Foreign Application Priority Data
Jun. 24, 2014   (EP) .................................... 14173764

(51) Int. Cl.
| | |
|---|---|
| C08K 3/34 | (2006.01) |
| C09D 163/00 | (2006.01) |
| C08K 3/36 | (2006.01) |
| C09D 7/43 | (2018.01) |
| C08K 9/04 | (2006.01) |
| C09J 163/00 | (2006.01) |
| C08G 59/40 | (2006.01) |
| C09D 7/00 | (2018.01) |
| C09J 11/04 | (2006.01) |
| C09J 11/06 | (2006.01) |

(52) U.S. Cl.
CPC .............. *C08K 3/34* (2013.01); *C08K 3/346* (2013.01); *C08K 3/36* (2013.01); *C08K 9/04* (2013.01); *C09D 7/00* (2013.01); *C09D 7/43* (2018.01); *C09D 163/00* (2013.01); *C09J 11/04* (2013.01); *C09J 11/06* (2013.01); *C08G 59/40* (2013.01); *C09J 163/00* (2013.01)

(58) Field of Classification Search
CPC ...... C08L 63/00–10; C09D 163/00–10; C09D 7/002; C09D 7/43; C09J 163/00–10; C08K 3/34; C08K 3/346; C08G 59/50
See application file for complete search history.

(56) References Cited

U.S. PATENT DOCUMENTS

| | | | |
|---|---|---|---|
| 4,762,752 A | 8/1988 | Haubennestel et al. | |
| 4,795,796 A | 1/1989 | Haubennestel et al. | |
| 4,857,111 A | 8/1989 | Haubennestel et al. | |
| 4,942,213 A | 7/1990 | Haubennestel et al. | |
| 5,130,463 A | 7/1992 | Haubennestel et al. | |
| 5,399,294 A | 3/1995 | Quednau | |
| 5,552,459 A * | 9/1996 | Baumann ............... | C08G 59/42 523/427 |
| 6,036,765 A * | 3/2000 | Farrow ................. | C04B 24/425 106/287.17 |
| 6,077,886 A | 6/2000 | Hayes et al. | |
| 6,111,054 A | 8/2000 | Haubennestel et al. | |
| 7,312,260 B2 | 12/2007 | Krappe et al. | |
| 8,545,667 B2 | 10/2013 | Lammerschop et al. | |
| 2002/0137865 A1 | 9/2002 | Haubennestel et al. | |
| 2002/0157780 A1* | 10/2002 | Onusseit ................ | B26D 1/185 156/264 |
| 2003/0144416 A1 | 7/2003 | Tarbutton et al. | |
| 2004/0019047 A1 | 1/2004 | Haubennestel et al. | |

(Continued)

FOREIGN PATENT DOCUMENTS

| | | |
|---|---|---|
| EP | 0174290 | 3/1986 |
| EP | 0 835 910 A1 | 4/1998 |
| EP | 2085426 | 1/2008 |

OTHER PUBLICATIONS

Versamid 140 Data Sheet (2017).*
BYK-9076 Data Sheet (2014).*
PCT/EP2015/064153—International Search Report, dated Sep. 4, 2015. English Translation.
PCT/EP2015/064153—International Written Opinion, dated Sep. 4, 2015. English Translation.
PCT/EP2015/064153—International Preliminary Report on Patentability, dated Dec. 27, 2016. English Translation.

(Continued)

*Primary Examiner* — Kregg T Brooks
(74) *Attorney, Agent, or Firm* — Curatolo Sidoti Co., LPA; Joseph G. Curatolo; Salvatore A. Sidoti

(57) ABSTRACT

The invention relates to a two-component or multi-component system having at least one epoxy resin component (1) that comprises i. at least one epoxy resin, ii. at least one inorganic thickener (a1) and iii. at least one wetting and dispersing agent (a2) that inhibits the thickening effect of said inorganic thickener (a1); as well as a curing component (2) which comprises i.) at least one component (b1) that at least partially cancels the inhibition of the thickening effect of the inorganic thickener (a1); said wetting and dispersing agent (a2) being non-reactive to the at least one epoxy resin, and the curing component (2) being reactive to said epoxy resin component (1). The invention also relates to substrates coated with a two-component or multi-component system according to the invention. The invention also relates to the use of a combination of (a1) and (a2) in epoxy resin compositions, in order to give the formulation a latent thickening effect.

12 Claims, No Drawings

(56) References Cited

U.S. PATENT DOCUMENTS

| | | |
|---|---|---|
| 2004/0143035 A1 | 7/2004 | Goebelt et al. |
| 2005/0250027 A1 | 11/2005 | Pritschins et al. |
| 2006/0069224 A1 | 3/2006 | Pritschins et al. |
| 2006/0089426 A1 | 4/2006 | Haubennestel et al. |
| 2007/0104958 A1* | 5/2007 | Golden .................. B32B 27/38 428/413 |
| 2007/0185272 A1 | 8/2007 | Goebelt |
| 2007/0259120 A1 | 11/2007 | Haubennestel et al. |
| 2009/0221745 A1 | 9/2009 | Orth et al. |
| 2010/0022662 A1 | 1/2010 | Göbelt et al. |
| 2010/0029834 A1 | 2/2010 | Göbelt et al. |
| 2010/0099813 A1 | 4/2010 | Göbelt et al. |
| 2010/0168316 A1 | 7/2010 | Gobelt et al. |
| 2010/0323112 A1 | 12/2010 | Rick et al. |
| 2013/0177719 A1* | 7/2013 | Tasaka .................... C09D 4/00 428/32.26 |
| 2014/0012036 A1 | 1/2014 | Omeis et al. |
| 2014/0194537 A1 | 7/2014 | Göbelt et al. |
| 2015/0038641 A1 | 2/2015 | Göbelt et al. |
| 2015/0159041 A1* | 6/2015 | Li .......................... C08G 71/04 428/413 |

OTHER PUBLICATIONS

Bittmann, Eva, "Viel Wing um GFK. Werkstoffe und Verfahren im Rotorbattbau," Kunststoffe, 2002, vol. 92, No. 11, pp. 112-124.

\* cited by examiner

EPOXY RESIN-EPOXY CURING SYSTEMS WITH A LATENT THICKENING TENDENCY

CROSS REFERENCE TO RELATED APPLICATIONS

This application is a national stage application of International Application No. PCT/EP2015/064153, filed 23 Jun. 2015, which claims priority from European Patent Application No. 14173764.3, filed 24 Jun. 2014, which applications are incorporated herein by reference.

The present invention relates to rheology-controlled curing epoxy resin two-component or multicomponent systems which are obtained using latent thickeners. The systems are two-component or multicomponent systems, more particularly adhesives, sealants, coating materials or molding compounds.

Particularly within the field of adhesives, sealants, coatings materials, and molding compounds it is necessary to tailor the rheological properties of such systems. Consistency is adjusted primarily through the selection of binders, solvents, and the amount of pigments and/or fillers. In many cases, however, adjusting the desired consistency by means of the aforementioned constituents is not enough. In such cases, additives known as rheological additives must be added. Their effect may be a decrease in viscosity for better processing qualities, or an increase in viscosity, also referred to in the context of the present invention as thickener.

For the stated applications, a multitude of different organic or inorganic thickeners are described.

Employed primarily in aqueous systems in this context are cellulose ethers, starch, natural hydrocolloids, synthetic biopolymers, polyacrylate thickeners, associative thickeners based on hydrophobically modified polymers such as polyethers, etherurethanes, polyacrylamides, and alkali-activated acrylate emulsions, or water-swellable inorganic thickeners.

Typical rheological additives for nonaqueous systems, besides organic thickeners such as waxes and thixotropic resins, are inorganic thickeners such as, for example, magnesium oxide and magnesium hydroxide, which are used primarily in unsaturated polyester resin systems, or amorphous silicas and phyllosilicates.

A feature common to all of the aforesaid inorganic thickeners, however, is that in the aqueous, and more particularly nonaqueous systems, that are to be thickened, they develop their viscosity-increasing effect directly after incorporation and/or mixing. This is a disadvantage particularly in two-component or multicomponent systems.

Two-component systems in the narrower sense are those systems in which a chemical reaction which leads to curing is initiated by mixing two components, in the ratio required for curing. The individual components here are usually themselves not coating materials, adhesives, sealants or molding compounds, since either they are incapable of crosslinking and/or film-forming or they do not produce stable films, adhesive bonds or moldings. The mixture of the components must be processed within a defined time (pot life or working time), since the processing properties deteriorate increasingly when this time has expired. Such two-component systems are used in particular when there are especially exacting requirements in terms of the temperature sensitivity of the article to be coated and/or the article size is unusually large (facings, machines, rotor blades of wind turbines, etc.), or in terms of resistance to mechanical, chemical, and climatic exposures with rapid curing at room temperature (23° C.) or less, or slightly elevated temperatures (up to 100° C. for example). In the present invention, two-component or multicomponent systems are understood to be systems which are produced by mixing before use at least two components initially stored separately, and which cure after being mixed. Three- or multicomponent systems differ from two-component systems only in that one or more further components are added to the mixture, and in the case of chemical curing are able to participate in the chemical reaction or initiate it, or else possess a different function. In the case of two- or multicomponent systems, each of the components is stored separately and only when needed the preferably reactive mixture of the components is produced.

With conventional two- or multicomponent mixtures, the viscosity of each of the components must first be adjusted separately, with the aim being to avoid large differences in viscosity. The viscosity of the individual components here is typically relatively high already, having the effect of making them more difficult to transport, and also to process or mix homogeneously.

Particular significance therefore attaches to setting an initially very low viscosity of the individual components of two- or multicomponent systems.

Especially in the adhesives sector, in particular in epoxy resin/amine curing agent systems, the challenge arises of adjusting the resin component and the curing component initially in each case to a very low viscosity, in order to ensure optimum and homogeneous miscibility of the components with one another. Alternatively, during and/or preferably after the mixing of the components, a sag-resistant consistency, which prevents the mixture simply running, ought to be established as rapidly as possibly. Only in this way it is possible for the finished adhesive mixture to be applied in film thicknesses of several millimeters to centimeters on substrates to be bonded. Exacting requirements are imposed in this respect particularly with substrates requiring large-surface-area bonding, such as the rotor blade halves of wind turbines, for example.

As described in EP 281 124 A2, the rapid attainment of a sag-resistant, meaning a high-viscosity, consistency is achieved frequently by dispersing a thixotropic agent into the resin, such as a hydrophilic fumed silica, for example. The curing agent is subsequently admixed. Subject to the proviso that a sufficient amount of thixotropic agent is added, the mixtures retain their consistency prior to gelling and curing.

A disadvantage of the aforementioned system is that systems filled with fumed silica, such as the starting resin mixture used prior to mixing, customarily have a high viscosity. There are therefore great limits on the amount of fumed silica that can be used. Another disadvantage of many systems of this kind, moreover, is that under the influence of mechanical stress or heat, before gelling of the system occurs, the sag resistance is lost and in certain cases is never regained either. The reason for this is probably that the internal network of hydrogen bonds between the silica particles, which is responsible for the thickening effect, undergoes at least partial collapse.

One approach to preventing the collapse of such networks and therefore to retaining the sag resistance is to reinforce the network. This is accomplished for example by addition of a high molecular mass polyethyleneimine having a weight-average molar mass of about 750 000 g/mol, as described in EP 0 835 910 A1.

Also known are rheological additives based on polyhydroxycarboxamides, which in combination with fumed silica, in solventborne systems, enhance the incorporation of the silica and increase and stabilize the thixotropic behavior.

Such products are, for example, also used in the compositions comprising fumed silica that are described in WO 2010/147690 A2, in tandem with a dispersant (Disperbyk-161), in order to improve the leveling of paints.

There is, however, a need in particular for amine-curing epoxy resin systems which comprise inorganic thickeners whose viscosity-increasing property in the system in question is suppressed, in other words inhibited, until this property is required.

A chemical path for solving these problems is set out, in the sector of industrial adhesives for the bonding of rotor blade halves, for example, by Eva Bittmann in the article "Viet Wind um GFK. Werkstoffe and Verfahren im Rotorblattbau", Kunststoffe 92 (11) (2002) pages 119-124. In this article, the use is described of a variety of resin systems, such as, for example, the use of epoxy resins, vinyl ester resins or unsaturated polyester resins, for the bonding of rotor blade components. It is noted that for the bonding of shells and webs, thick adhesive seams are required, where the material must not run on sloping surfaces, meaning that highly thixotroped systems are to be employed. In accordance with the aforesaid article, the company Vantico developed a chemical thixotroping of epoxy resin adhesives, not described in any more detail, which takes place only when resin and curing agent are mixed, thereby allowing easy transport of the low-viscosity starting components and high sag resistance on the part of the mixture.

Also used in the area of aqueous systems, for example, are organic thickeners based on homo-, co-, and terpolymers of acrylic acid and methacrylic acid, which exhibit no thickening effect for as long as their carboxylic acid groups are protonated. Only by means of at least partial neutralization high-viscosity solutions are formed through the formation of gel structures in the water phase via hydrogen bonds, association of water molecules along the polymer chains, and intramolecular repulsion and uncoiling through formation of the carboxyl groups. Polymeric thickeners of this kind are not, however, used in nonaqueous systems.

There is therefore still a great desire to provide (amine-)curing epoxy resin systems which comprise latent-thickening inorganic thickeners, which preferably develop their thickening effect, even in nonaqueous systems, only when this effect is desired.

It would be particularly advantageous for the use of an inorganic thickener, in adhesives or sealants, for example, to be able at the same time to increase the binding force of the cured adhesive or sealant and thus to increase the mechanical stability of the adhesive bond. This is useful in particular where bonds are used under high mechanical stress, as in the case of adhesive bonds of rotor blades, for example, which are consequently able to accommodate greater mechanical energy.

To date there has been no (amine-)curing epoxy resin system available based on latent inorganic thickeners that meets the requirements addressed above.

An object of the present invention, therefore, was to provide epoxy resin curing agent systems which are preferably adhesives, sealants, coating materials or molding compounds. Such two-component or multicomponent systems are to be capable, after mixing of the components, especially of the epoxy resin component and the curing agent component, to develop the thickening effect which initially is present only in latent form.

In particular the thickeners ought also to be capable of enhancing the mechanical properties of the cured two- or multicomponent systems, and especially of increasing their stability.

The above objects can be achieved through provision of a two- or multicomponent system comprising
- at least one epoxy resin component 1 which comprises
  - i. at least one epoxy resin,
  - ii. at least one inorganic thickener (a1), and
  - iii. at least one wetting and dispersing agent (a2) which inhibits the thickening effect of the inorganic thickener (a1); and a
- curing agent component 2 which comprises
  - i.) at least one component (b1) which at least partly eliminates the inhibition of the thickening effect of the inorganic thickener (a1), and
- the wetting and dispersing agent (a2) being nonreactive toward the at least one epoxy resin and the curing agent component 2 being reactive toward the epoxy resin component 1.

The epoxy resin component 1 and the curing agent component 2 represent two spatially separate individual components which are in a functional unit through a goal-directed use ("Kit-of-Parts"). In the present case, the goal-directed common use of the initially spatially separate components is to equip the two- or multicomponent system with the latent thickening property. This means that an increase in viscosity takes place after mixing of components 1 and 2 and, optionally, of further components of the two- or multicomponent systems.

The condition to the effect that the wetting and dispersing agent (a2) is not reactive toward the at least one epoxy resin is understood by a person of ordinary skill in the present art to mean that under the customary storage conditions, the wetting and dispersing agents (a2) behave preferably very largely inertly toward the epoxy resin. An inert behavior is understood more particularly as a chemically inert behavior. This means that the epoxy resin component 1 is preferably storage-stable. The storage stability may be ascertained for example by way of the constancy of the viscosity of the stored epoxy resin component 1. The viscosity of the epoxy resin component 1 is to change insubstantially, if at all, preferably even over a prolonged storage period. Such possible, albeit unwanted, increases in viscosity are, however, not brought about by the effect according to the invention, since not all of the additives needed are present at the same time, being instead present spatially separately in the different base components (epoxy resin component 1 and curing agent component 2). In any case it is preferred that no reaction between the epoxy resin of the epoxy resin component 1 and wetting and dispersing agent (a2) to take place between incorporation of the wetting and dispersing agent (a2) into the epoxy resin of the epoxy resin component 1, and the mixing of the epoxy resin component 1 with the curing agent component 2.

The requirement that the curing component 2 is reactive toward the epoxy resin component 1 means that the curing component 2 comprises a constituent which is reactive toward the epoxy resin of the epoxy resin component 1. This constituent may, for example, be a typical epoxide curing agent. It is entirely possible, however, for the reactive constituent on its own to be component (b2), which is preferably identical with a typical epoxide curing agent.

Epoxy resin and the associated curing agent ("epoxide curing agent") form, as a reactive mixture, the epoxy resin binder which cures by way of polyaddition reactions. The epoxy resins (EP resins), also referred to as epoxide resins or ethoxyline resins, are according to DIN 7728—oligomeric compounds having more than one epoxide group per molecule. On curing, monomeric and oligomeric components of the binder, through the crosslinking reaction, form three-dimensional networks of high molecular mass. Network nodes originate from the reaction of the functional groups of the epoxy resins and curing agents. In this reaction, strong covalent chemical bonds are formed.

The fully cured binders (thermoset networks) are substantially insoluble and infusible, and are also highly robust chemically and mechanically (see Kittel, "Lehrbuch der Lacke and Beschichtungen", volume 2, second edition, 1998, pp. 268-269).

Characteristic of the epoxy resin is the functional group, the oxirane ring (also referred to as epoxide ring or 1,2-epoxide).

The two- and multicomponent systems of the invention may in particular be aqueous or nonaqueous, preferably nonaqueous, two- or multicomponent systems. For the purposes of the invention, systems referred to as nonaqueous are those which are substantially water-free, meaning preferably those which contain less than 10 wt %, more preferably less than 8 wt %, very preferably less than 5 wt % of water, based on the overall composition of the system.

Epoxy Resin Component 1

Epoxy Resins

Epoxy resins contain in their molecule more than one oxirane ring and can be converted into cured epoxy resins with the curing component through reaction of the oxirane rings. Customary epoxy resins are prepared by reaction of reactive phenols, alcohols, acids, and amines with epichlorohydrin, and contain the oxirane rings in the form of a glycidyl group. The number of reactive structures forming epoxy resins through a reaction with epichlorohydrin is virtually unlimited, and so there are a large number of industrially significant resins. Furthermore, unsaturated aliphatic and cycloaliphatic compounds have been epoxidized directly using peracetic acid, for example (Kittel, ibid).

In principle all epoxy resins obtainable via the aforementioned processes can be used for the purposes of the present invention.

The epoxy resins which can be used in accordance with the invention are preferably those selected from the group consisting of glycidyl ethers, such as bisphenol-A-diglycidyl ether, bisphenol-F-diglycidyl ether, epoxide-novalak, epoxide-o-cresol-novolak, 1,3-propane-, 1,4-butane- or 1,6-hexane-diglycidyl ethers and polyalkylene oxide glycidyl ethers; glycidyl esters, such as diglycidyl hexahydrophthalate; glycidylamines, such as diglycidylaniline or tetraglycidylmethylenedianiline; cycloaliphatic epoxides, such as 3,4-epoxycyclohexylepoxyethane or 3,4-epoxycyclohexylmethyl-3,4-epoxycyclohexanecarboxylate; and glycidyl isocyanurates, such as trisglycidyl isocyanurate.

The epoxy resins used for the purposes of the present invention preferably possess epoxide equivalent weights of 100 to 300 g, more preferably 130 to 220 g. Bisphenol-A-diglycidyl ether, for example, possesses an epoxy equivalent weight of about 170.2 g (molar mass: 340.4 g/mol; two oxirane groups; 340.4 g/2=170.2 g).

Other epoxy resins suitable for the two- or multicomponent systems of the invention are disclosed in EP 0 835 910 A1, EP 2 085 426 A1 or EP 1141071 A1, for example.

Inorganic Thickeners (a1)

The inorganic thickener (a1) is selected preferably from the group consisting of phyllosilicates and amorphous silicas, more preferably phyllosilicates and precipitated or fumed silicas. Precipitated silicas are obtained wet-chemically by precipitation, while fumed silicas are obtained by continuous flame hydrolysis.

Among the inorganic thickeners, phyllosilicates and fumed silicas are preferred in particular. In contrast to the wet-chemically obtained silicas (precipitated silicas), which usually possess very high internal surface areas, silicas obtained by flame hydrolysis consist of virtually spherical primary particles having particle diameters of typically 7 to 40 nm. They have essentially only an outer surface. This surface is partly occupied by silanol groups. The high fraction of free silanol groups gives untreated fumed silica a hydrophilic character. It is also possible, however, though more costly, to subject the originally hydrophilic surface of fumed silicas to organic aftertreatment, with dimethyldichlorosilane, trimethoxyoctylsilane or hexamethyldisilazane, for example, in which case the majority of the silanol groups are saturated with organic groups and hence the hydrophilic silica is rendered hydrophobic. The fumed silicas can therefore be present in the form of non-organically modified fumed silicas or of hydrophobically modified fumed silicas, the non-organically modified fumed silicas being particularly preferred.

Among the phyllosilicates, particular preference is given to clay materials, and particular preference in turn to the organically modified clay materials (also referred to as organoclays).

Especially preferred as inorganic thickener (a1) are phyllosilicate mixtures which have been surface-treated with quaternary alkylammonium salts and comprise 50 to 95 wt %, based on the phyllosilicate mixture, of a clay mineral selected from the group consisting of sepiolite and palykorskite or mixtures thereof, and less than 50 wt %, based on the phyllosilicate mixture, of at least one smectite. The 50 to 95 wt % of sepiolite and/or palykorskite together with the at least one smectite add up preferably to at least 95 wt %, more particularly to 100 wt %, based on the phyllosilicate mixture.

The smectite or the smectites may be selected in turn preferably from the group consisting of hectorite, montmorillonite, bentonite, beidelite, saponite, stevensite, and mixtures thereof.

The quaternary alkylammonium salts may be represented preferably in the general formula $(C_{1-10}\text{-alkyl})_n(C_{12-22}\text{-alkyl})_m(\text{benzyl})_p N^+ X^-$, where n+m+p=4 and n=1 or 2, m=1 or 2, p=0 or 1, and $X^-$=halide, preferably chloride, or sulfate. Particularly preferred quaternary alkylammonium salts are dimethyldi($C_{14-18}$-alkyl)ammonium chloride, methylbenzyldi($C_{14-18}$-alkyl)ammonium chloride, dimethylbenzyl($C_{14-18}$-alkyl)ammonium chloride, and dimethyl(2-ethylhexyl) ($C_{14-13}$-alkyl) ammonium sulfate. The above $C_{14-18}$-alkyl radical is preferably a hydrogenated tallow-alkyl radical.

With particular preference the above-described phyllosilicate mixture is treated with κ to 80 milliequivalents of the quaternary alkylammonium salt.

Thickeners of this kind are available from BYK Chemie GmbH, Wesel, Germany under the trade name Garamite®.

Further inorganic thickeners (a1) of the category of phyllosilicates are available for example under the trade names Laponite®, Claytone® or Cloisite®, likewise from BYK Chemie GmbH.

Wetting and Dispersing Agents (a2)

The key requirement imposed on the wetting and dispersing agent (a2) is that it inhibits the thickening effect of the inorganic thickener (a1) (latent thickening).

The wetting and dispersing agents (a2) are agents which have one or more groups X with affinity to the thickener and therefore bind to the thickener surface covalently, ionically, and/or by physisorption. Moreover, they cause stabilization of the primary thickener particles and so prevent agglomeration, which leads otherwise to the sedimentation of the solids and hence separation of the millbase system. Responsible for this stabilization in general are one or more groups Y in the wetting and dispersing agent (a2) which ensure compatibility with the surrounding medium.

The wetting and dispersing agents (a2) used are preferably wetting and dispersing agents (a2) of relatively high molecular mass, more particularly polymeric wetting and dispersing agents (a2). Suitable functional polymers possess preferably a number-average molecular mass ($M_n$) of at least 400 g/mol, preferably at least 800 g/mol, more preferably at least 2000 g/mol. The maximum molecular weight $M_n$ is usefully 100 000 g/mol, preferably 50 000 g/mol, and more preferably 25 000 g/mol. The number-average molecular weights can be determined by gel permeation chromatography against a polystyrene standard.

The wetting and dispersing agent (a2) used in accordance with the invention more particularly can be selected from the group of linear or branched polymers and copolymers having functional groups and/or groups with thickener affinity, alkylammonium salts of polymers and copolymers, polymers and copolymers having acidic groups, comb and block copolymers, such as block copolymers having, in particular, basic groups with thickener affinity, optionally modified acrylate block copolymers, optionally modified polyurethanes, optionally modified and/or optionally salified polyamines, epoxide-amine adducts, phosphoric esters, especially those of polyethers, polyesters, and polyetheresters, basic or acidic ethoxylates such as alkoxylated monoamines or polyamines or acidic 1,2-dicarboxylic anhydride monoesters of alkoxylated monoalcohols, reaction products of unsaturated fatty acids with mono-, di-, and polyamines, amino alcohols, and unsaturated 1,2-dicarboxylic acids and their anhydrides and their salts and reaction products with alcohols and/or amines; polymers and copolymers with fatty acid residues, optionally modified polyacrylates, such as transesterified polyacrylates, optionally modified polyesters, such as acid-functional and/or amino-functional polyesters, polyphosphates, and also mixtures thereof.

Especially preferred for selection as wetting and dispersing agents (a2) are those compounds as described in publications EP 0 154 678 B1, EP 0 270 126 B1, EP 0 318 999 B1, EP 0 417 490 B1, EP 0 879 860 B1, EP 0 893 155 B1, EP 1081 169 B1, EP 1416 019 A1, EP 1650 246 A1, EP 1742 90, EP 1803 753, EP 1837 355, EP 2668240, WO 2012175159, WO 2012175157, DE 102006048144, DE 102006062439, DE 102006062440, DE 102006062441, and DE 102007005720, more preferably the wetting and dispersing agents (a2) claimed in EP 0 893 155 B1 and EP 2 668 240.

Polymeric wetting and dispersing agents (a2) based on polyisocyanates are described for example in EP 0 154 678, EP 318 999, and EP 0 438 836. These products are prepared by addition reaction of monohydroxy compounds, diisocyanate-functional compounds, and compounds having a tertiary amino group onto the existing NCO groups of polyisocyanates containing isocyanurate, biuret, urethane and/or allophanate groups.

One preferred embodiment uses wetting and dispersing agents (a2) which are obtainable by salification of an amine-functional compound with an acid, the amine-functional compound used being a polyamine having at least three amino groups from the group of "unmodified, aliphatic linear or branched polyamines of the following group: "diethylenetriamine, triethylenetetramine, tetraethylenepentamine, pentaethylenehexamine, hexamethyleneheptamine, linear polymerizates of general formula $NH_2-(C_2H_4NH)_n-C_2H_4-NH_2$ with n>5, it being possible for protons on the nitrogen therein to have been replaced by alkyl, aryl and/or aralkyl groups and/or for the nitrogen to be in quaternized form, branched ($C_2$-$C_4$)-alkyleneamines and poly($C_2$-$C_4$)alkyleneimines having tertiary amino groups and a number-average molecular weight of up to 1 000 000 g/mol or a mixture of such amines"; modified polyamines based on the aforesaid unmodified polyamines, these being polyamines reacted with mono- or polyisocyanates which possess v NCO groups of which (v-1) NCO groups have reacted beforehand with other reactants, polyamines reacted with epoxy-functional compounds, polyamines reacted with cyclic carbonates, polyamines reacted by a Michael reaction with α,β-unsaturated compounds, alkylated and/or quaternized polyamines and/or polyamines amidated with carboxylic acids, with the proviso that after the modification there are still three salifiable amino groups present per molecule, or a mixture of such polyamines and/or polyamines of the following group: "homo- or copolymerizates of amine-functional (meth)acrylates or vinyl compounds, and also amine-functional homo- or copolymers in which the amino group, by means of polymer-analogous reaction, was inserted into the pre-prepared polymer or generated on this polymer, or a mixture of such polyamines", the homo- or copolymerizate having a number-average molecular weight of up to 1 000 000 g/mol", and the acid used being a compound from the group of "phosphoric esters of the general formula: $(OH)_{3-n}PO(OR^a)_n$ with n=1 or 2, sulfonic acids of the general formula $HOSO_2R^b$, acidic sulfuric esters of the general formula $HOSO_3R^b$" where $R^a$ and $R^b$ are an alkyl, aryl or aralkyl radical having at least 5 carbon atoms and/or a radical of an oxalkylated alcohol having a number-average molecular weight between 100 and 5000 g/mol and/or a radical having at least one carboxylic ester group and/or a urethane group with a number-average molecular weight between 100 and 5000 g/mol, or a mixture of such substances, where $R^a$ and $R^b$ are identical or different and, optionally, hydrogen atoms in the aliphatic groups of the radicals $R^a$ and $R^b$ have been replaced in part by halogen atoms, and the acid optionally carries further functional groups which behave inertly in the salification; and there being at least one amino group salified per molecule.

The following groups of wetting and dispersing agents (a2) display particularly good effect in the dispersions of the invention: (a) phosphoric ester salts of amino group-containing oligomers or polymers, such as, for example, phosphoric ester salts of optionally fatty acid-modified or alkoxylated (especially ethoxylated) polyamines, phosphoric ester salts of epoxide-polyamine adducts, phosphoric ester salts of amino group-containing acrylate or methacrylate copolymers, and phosphoric ester salts of acrylate-polyamine adducts, (b) monoesters or diesters of phosphoric acid, such as monoesters or diesters of phosphoric acid with alkyl, aryl, aralkyl or alkylaryl alkoxylates, for example (e.g., phosphoric monoesters or diesters of nonylphenol ethoxylates, isotridecyl alcohol ethoxylates, butanol-started alkylene oxide polyethers), mono- or diesters of phosphoric acid with polyesters (e.g. lactone polyesters, such as caprolactone polyesters or mixed caprolactone/valerolactone polyesters), (c) acidic dicarboxylic monoesters, examples being acidic dicarboxylic monoesters (especially of succinic acid, maleic acid or phthalic acid) with alkyl, aryl, aralkyl or alkylaryl alkoxylates (e.g., nonylphenol ethoxylates, isotridecyl alcohol ethoxylates or butanol-started alkylene oxide polyethers), (d) polyurethane-polyamine adducts, (e) polyalkoxylated monoamines or diamines (e.g., ethoxylated oleylamine or alkoxylated ethylenediamine), and (f) reaction products of unsaturated fatty acids with mono-, di-, and polyamines, amino alcohols, and unsaturated 1,2-dicarboxylic acids and their anhydrides and their salts and reaction products with alcohols and/or amines.

Wetting and dispersing agents (a2) of these kinds are available as commercial products from, for example, BYK-Chemie from Wesel, under the trade names BYK-220 S, BYK-P 9908, BYK-9076, BYK-9077, BYK-P 104, BYK-P 104 S, BYK-P 105, BYK-W 9010, BYK-W 920, BYK-W 935, BYK-W 940, BYK-W 960, BYK-W 965, BYK-W 966, BYK-W 975, BYK-W 980, BYK-W 990, BYK-W 995, BYK-W 996, BYKUMEN, BYKJET 9131, LACTIMON, ANTI-TERRA-202, ANTI-TERRA-203, ANTI-TERRA-204, ANTI-TERRA-205, ANTI-TERRA-206, ANTI-TERRA-207, ANTI-TERRA-U 100, ANTI-TERRA-U 80, ANTI-TERRA-U, LP-N-21201, LP-N-6918, DISPERBYK, DISPERBYK-101, DISPERBYK-102, DISPERBYK-103, DISPERBYK-106, DISPERBYK-107, DISPERBYK-108, DISPERBYK-109, DISPERBYK-110, DISPERBYK-111, DISPERBYK-112, DISPERBYK-115, DISPERBYK-116, DISPERBYK-118, DISPERBYK-130, DISPERBYK-140, DISPERBYK-142, DISPERBYK-145, DISPERBYK-160, DISPERBYK-161, DISPERBYK-162, DISPERBYK-163, DISPERBYK-164, DISPERBYK-165, DISPERBYK-166, DISPERBYK-167, DISPERBYK-168, DISPERBYK-169, DISPERBYK-170, DISPERBYK-171, DISPERBYK-174, DISPERBYK-176, DISPERBYK-180, DISPERBYK-181, DISPERBYK-182, DISPERBYK-183, DISPERBYK-184, DISPERBYK-185, DISPERBYK-187, DISPERBYK-190, DISPERBYK-191, DISPERBYK-192, DISPERBYK-193, DISPERBYK-194, DISPERBYK-2000, DISPERBYK-2001, DISPERBYK-2008, DISPERBYK-2009, DISPERBYK-2010, DISPERBYK-2020, DISPERBYK-2025, DISPERBYK-2050, DISPERBYK-2070, DISPERBYK-2090, DISPERBYK-2091, DISPERBYK-2095, DISPERBYK-2096, DISPERBYK-2150, DISPERBYK-2151, DISPERBYK-2152, DISPERBYK-2155, DISPERBYK-2163, DISPERBYK-2164, DISPERBLAST-1010, DISPERBLAST-1011, DISPERBLAST-1012, DISPERBLAST-1018, DISPERBLAST-I, DISPERBLAST-P. Where the desire is for a low content of volatile organic compounds, especially of organic solvents, the aforementioned commercial products ought as far as possible to be used as solvent-free active substances and ought where appropriate to be freed wholly or partly from volatile constituents by means of distillation, for example.

The inhibition of the thickening effect means that the inorganic thickener (a1) loses at least part of its otherwise present viscosity-increasing effect as a result of the presence of the wetting and dispersing agent (a2). These losses in viscosity increase are based on an interaction between the thickener and the wetting and dispersing agent. The inhibition of the thickening effect, in other words the thickening loss or lowering of the thickening effect of the inorganic thickener (a1) by the wetting and dispersing agent (a2), may also be reported on a percentage basis, as shown in the Examples section. In this case, the base value for the viscosity is the viscosity of a formulation measured, however, without addition of the wetting and dispersing agent (a2), and compared with an identical formulation which, however, contains the wetting and dispersing agent (a2). From this the percentage drop in viscosity arising from the presence of the wetting and dispersing agent (a2) is calculated. This percentage drop is preferably at least 10%, more preferably at least 20%, very preferably at least 40% or at least 80% or even at least 90% up to preferably 99.9%. The viscosity is determined as specified in the Examples section.

The inhibition of the thickening effect is produced preferably by a reversible binding of the wetting and dispersing agents (a2) to the surface of the inorganic thickener (a1).

Reversible binding of the wetting and dispersing agent (a2) is ought to be present at temperatures at which two- or multicomponent systems are customarily mixed.

Reversibility is present preferably at temperatures below 80° C., more preferably at temperatures below 50° C., and very preferably at temperatures below 30° C., such as in particular at room temperature (23° C.)

In order to ensure reversibility of the binding, the wetting and dispersing agent (a2) is preferably selected such that weak intermolecular interactions—such as, for example, Van-der-Waals interactions, dipole-dipole interactions, or hydrogen bonds—are formed to the surface of the inorganic thickener and prevent partial or complete development of the rheological properties of the inorganic thickener.

In terms of their behavior, the wetting and dispersing agents (a2) are preferably substantially chemically inert to the other constituents of the epoxy resin component 1.

The substantial chemical inertness relative to the constituents of the epoxy resin component 1 may be achieved essentially in two ways. One option is to use a wetting and dispersing agent which contains no groups that are reactive toward the aforementioned constituents, or that triggers unwanted reactions through catalytic activity. A second option is to use wetting and dispersing agents in which, while there are potentially reactive groups present, these groups are nevertheless shielded—sterically, for example—in such a way that reaction with the constituents in the epoxy resin component 1 under storage conditions takes place not at all or at a negligibly slow rate.

Wetting and dispersing agents (a2) with multi-capacity usefulness that are especially suitable for the purposes of the present invention prove to be wetting and dispersing agents which possess an amino group-containing polymeric backbone on which there are polyester and/or polyether and/or polyester and polyether side chains. Such wetting and dispersing agents are particularly suitable for those inorganic thickeners (a1) which are selected from the group of phyllosilicates, precipitated silicas, and fumed silicas, more particularly of phyllosilicates and fumed silicas, and very preferably of phyllosilicates and non-organically modified fumed silicas. The polyester and/or polyether and/or polyester and polyether side chains of such wetting and dispersing agents can be compressed when the inorganic thickeners are dispersed, with the adhesion forces of the aminic groups toward the thickener surface being strengthened. The aminic groups with thickener affinity are able then to adsorb to the thickener surface, while the side chains shield the aminic groups. Wetting and dispersing agents which comprise shielded aminic groups of this kind can therefore also be used in conjunction with those components of two- or multicomponent systems of the invention that are actually reactive toward aminic groups, for example in solvent-borne or solvent-free epoxy resins. Substantial reaction between the epoxy groups of the resin and the shielded amino groups of the wetting and dispersing agent consequently does not take place, with the result that a substantially chemically inert behavior, for the purposes of this invention, is present. At the same time, the wetting and dispersing agent shields the inorganic thickener (a1) and hinders it from full or partial development of its thickening effect.

Particularly suitable, for example, are reaction products of (a.) polyhydroxymonocarboxylic acids, which are preferably polyester-modified, with (b.) aziridine homopolymers, which are preferably polyester-modified, and (c.) monoisocyanates which carry polyester radicals, polyether radicals, polyester-polyether radicals or the radical of a hydroxycarboxylic acid, and last-mentioned compounds may be obtained for example, by reaction of an isocyanate group of a diisocyanate with the hydroxyl group of a hydroxycarboxylic acid. Products of this kind are disclosed in EP 2 668 240 A1, for example.

A wetting and dispersing agent (a2) which can be used and is particularly suitable in the context of this invention is, for example, the highly branched wetting and dispersing agent DISPERBYK-2151, from BYK Chemie GmbH, which has hitherto been recommended only for pigments and fillers. This wetting and dispersing agent allows outstanding dispersal of phyllosilicates, precipitated silicas, and fumed silicas, especially phyllosilicates and fumed silicas, in a multitude of chemically different components. There is compatibility, for example, with epoxy resins as are used in epoxy resin-curing agent two- or multicomponent systems.

The compatibility of the wetting and dispersing agent for the system in question is directly evident to a person of ordinary skill in the art when, for example, on account of the absence of complementary reactive groups, no reaction is expected, or the corresponding groups are sterically shielded. Accordingly in principle there is a multiplicity of suitable wetting and dispersing agents available. An ad hoc test as to whether steric shielding of potentially reactive groups in the wetting and dispersing agent is sufficient for it to be used in a particular two- or multicomponent system of the invention may be made by the person of ordinary skill in the art on the basis of simple rangefinding tests.

The combination of inorganic thickener (a1) and at least one wetting and dispersing agent (a2) may be solid at room temperature (23° C.). Hence this combination may preferably be an inorganic thickener (a1) coated with a wetting and dispersing agent (a2), preferably in powder form.

Since the wetting and dispersing agent (a2) are frequently used in the form in which they are obtained at synthesis the wetting and dispersing agents (a2) may also comprise, from the preparation process, auxiliaries used for the synthesis, such as catalysts, emulsifiers, and the like, for example. Such auxiliaries are considered as belonging to the solids content of the combination of inorganic thickener (a1) and at least one wetting and dispersing agent (a2).

Other Constituents of the Epoxy Resin Component 1

Besides the epoxy resin, the inorganic thickener (a1), and the wetting and dispersing agent (a2), the epoxy resin component 1 may also contain other constituents.

Other constituents include solvents, especially organic solvents, and/or water.

It is likewise possible for what are called reactive diluents to be present, which can be incorporated into the polymeric network in the course of curing. Such diluents are, in particular, monoglycidyl ethers and monoglycidyl esters. Preferred among the monoglycidyl ethers are $C_{10}$-$C_{14}$-alkyl monoglycidyl ethers, preferably $C_{12}$-$C_{14}$-alkyl monoglycidyl ethers.

Preferred among the monoglycidyl esters are monoglycidyl esters of $C_8$-$C_{14}$-carboxylic acids, particular preference among these being given to monoglycidyl esters of $C_{10}$-$C_{12}$-carboxylic acids such as, in particular, a branched $C_{10}$-carboxylic monoglycidyl ester, namely glycidyl neodecanoate.

The diglycidyl ethers of $C_3$-$C_6$-alkanes that are frequently also available commercially under the designation of reactive diluents are considered herein to be epoxy resins, as are all compounds containing at least two oxirane groups.

Furthermore, the epoxy resin component 1 may comprise further additives, of the kind customary in adhesives, sealants, coating materials, and molding compounds. Mention among these may be made in particular of defoamers, leveling agents or wetting and dispersing agents different from the wetting and dispersing agents (a2), catalysts which can catalyze the epoxy resin-curing agent reaction, and, in particular, pigments and inorganic fillers different from the inorganic thickeners (a1), or else organic fillers.

Curing Agent Component 2

Curing Agent

The curing agents of the present invention are used for curing epoxy resin component 1. Curing agents of this kind are designated in their function as "epoxide curing agents", in line with the relevant specialist literature (for example: Kittel, "Lehrbuch der Lacke and Beschichtungen", volume 2, $2^{nd}$ edition, 1998, pp. 267 to 318).

The curing agents are substances with a functionality of two or more whose functional groups are able to react with oxirane groups (compounds having active hydrogen, in particular with hydrogen bonded to nitrogen or oxygen). The curing agents are preferably employed substantially stoichiometrically relative to the epoxy resin. The concentration of the oxirane rings in the epoxy resin can be determined by means of titrimetry, for example. The amount of curing agent required can be calculated from the equivalent weight of active hydrogen ("H-active equivalent weight") of the curing agent.

The curing agents which can be used in accordance with the invention are preferably those selected from the group consisting of diamines and polyamines, polyamides, and cyclic carboxylic anhydrides. Among the classes of compounds referred to above, the diamines and polyamines and polyamides are especially preferred. Especially preferred are di- and polyamines. In its most preferred embodiment, therefore, the curing agent may also be termed an amine curing agent.

Particularly preferred di- and polyamines may be selected from the group of aliphatic amines, such as diethylenetriamine, triethylenetetramine or 3,3',5-trimethylhexamethylenediamine; cycloaliphatic amines, such as 1,2-cyclohexyldiamine, isophoronediamine and its isomer mixtures, or m-xylylenediamine; aromatic amines, such as methylenedianiline or 4,4-diaminodiphenyl sulfone; modified amines, such as Mannich bases (for example, diethylene triamine-phenol Mannich base), or amine adducts of 3,3',5-trimethylhexamethylenediamine and bisphenol-A-diglycidyl ether.

Particularly preferred curing agents of the polyamide type are polyaminoamides or dicyandiamide.

Representatives of cyclic carboxylic anhydrides are, for example, phthalate anhydride or hexahydrophthalate anhydride. The cyclic carboxylic anhydrides are used primarily, however, in hot-curing epoxy resin systems, while the present invention relates primarily and preferably to systems which cure even at room temperature (or below 100° C.)

The equivalent weights of active hydrogen in the curing agent are preferably 15 to 70 g, more preferably 20 to 60 g. For isophoronediamine, the H-active equivalent weight is for example 42.57 g (molar mass: 170.3 g/mol; 2 $NH_2$ groups each with two active hydrogen atoms=4 active hydrogen atoms; 170.3 g divided by 4=42.57 g).

A non-exhaustive compilation of suitable amine curing agents is found in EP 0835 910 A1.

As curing agent it is also possible to use certain of the components (b1) described below. Since the use of component (b1) is mandatory, it is unnecessary to have a separate curing agent in those cases in which component (b1) also takes on the curing agent function. However, certain of the aforementioned typical epoxide curing agents (for example, isophoronediamine or triethylenetetramine) may also take on the function of component (b1) and in such a case are reckoned part of that component.

Component (b1)

Component (b1) is characterized in that it at least partially eliminates the inhibition of the thickening effect of the inorganic thickener (a1) that is brought about by the wetting and dispersing agent (a2).

These can be monomeric compounds or oligomeric or polymeric species, there being no linguistic distinction here between oligomeric and polymeric species. Oligomeric species are therefore subsumed below within the polymeric species. In particular, certain of the species listed as curing agents above are suitable simultaneously as component (b1).

The binding of component (b1) preferably involves at least partially displacement of the wetting and dispersing agent (a2) from the thickener surface, meaning that the interaction of component (b1) with the surface of the inorganic thickener (a1) is generally stronger than the interaction of the wetting and dispersing agent (a2) with the surface of the inorganic thickener (a1).

As a consequence of this, the groups of component (b1) that have thickener affinity are customarily not shielded. Higher affinity, however, may also be obtained if the components (b1), for example, have a relatively large number of groups with thickener affinity, in comparison to the wetting and dispersing agent (a2), and/or if the nature of the groups with affinity permits stronger binding to the surface of the thickener.

It is essential that component (b1) again at least partially eliminates the inhibition, by the wetting and dispersing agent (a2), of the thickening effect of the inorganic thickener (a1). With particular preference the thickening effect of the thickener is not only entirely or at least partly restored, but in fact the sag resistance is stabilized, with—for example—the internal network of hydrogen bonds between the thickener particles being strengthened by component (b1).

A suitable component (b1), which has, for example, greater affinity for fumed silicas than does the wetting and dispersing agent DISPERBYK-2151, mentioned by way of example likewise above, is the high molecular mass polyethyleneimine having a weight-average molar mass of around 750 000 g/mol as is described in the above-cited EP 0 835 910 A1. It not only is capable of at least partially eliminating the inhibition by the wetting and dispersing agent of the thickening effect of the thickener, but additionally stabilizes the network between the thickener particles that is responsible for the sag resistance. Other polymeric amines and fatty acid-salified polyethyleneimines as well, however, preferably tall oil fatty acid-salified polyethyleneamines, are suitable as component (b1).

Further suitable components (b1) are, for example, condensation products of dimer and/or trimer fatty acids, which may also be used in a mixture with monomeric fatty acids, with amines. Amines suitable for this purpose are, in particular, aliphatic and cycloaliphatic or else aromatic amines or mixtures of the aforesaid amines. Examples of such amines are m-xylylenediamine, 1,6-diaminohexane, isophoronediamine (isomer mixture; IPDA), triethylenetetramine (TETA); diethylenetriamine, tetraethylenepentamine, pentaethylenehexamine (isomer mixture), 1,3-diaminopropane, dipropylenetriamine or 2-(2-(2-aminoethylamino)ethyl-amino)ethanol or diethanolamine.

Also suitable as component (b1) are nonpolymeric monoamines and preferably polyamines, more particularly those which possess molecular uniformity and/or possess comparatively low number-average molecular weights $M_n$, such as, for example, polyalkylenepolyamines such as, for example, triethylenetetramine, but also cycloaliphatic diamines such as, for example, isophoronediamine.

Likewise suitable are monoetheramines such as diglycolamine (DGA), but also, in particular, polyetheramines of the kind, for example, available commercially from Huntsman under the trade name Jeffamine®, such as Jeffamine® T-403.

Likewise suitable are polyethylene oxide polyols such as polyoxyethylene sorbitan monolaurate (TWEEN 20), for example.

Component (b1) may be liquid or solid. Preferably component (b1) is liquid.

Since component (b1) is frequently used in the form in which it is obtained at synthesis, component (b1) may as a result of production also include auxiliaries used for the synthesis, such as catalysts and stabilizers, and the like, for example.

The selection of a suitable component (b1) is preferably made in a targeted way, taking account of the choice of the wetting and dispersing agent (a2).

Thus the component (b1) customarily possesses more polar and/or more basic groups with surface affinity than does the wetting and dispersing agent (a2), with the surface affinity relating to the surface of the inorganic thickener (a1). Where groups with surface affinity that are of similar polarity and/or basicity to those in component (b1) are present in the wetting and dispersing agent (a2), component (b1) preferably contains a greater weight-percentage fraction of groups with surface affinity in component (b1), compared with the weight percentage fraction of groups with surface affinity that are present in the wetting and dispersing agent (a2). With particular preference, in comparison to the wetting and dispersing agent (a2), component (b1) comprises not only a greater weight percentage fraction of groups with affinity for the surface of the inorganic thickener (a1) but also groups with surface affinity which are more polar and/or more basic in comparison to the groups with surface affinity in the wetting and dispersing agent (a2), very preferably groups with surface affinity which are more polar and more basic in comparison to the groups with surface affinity of the wetting and dispersing agent (a2).

On the other hand this means that when selecting the wetting and dispersing agent (a2), the wetting and dispersing agent that must be or ought to be selected is not the one that is "best" for dispersing of the inorganic thickener (a1), affording the maximum reduction in viscosity in relation to the inhibition of the thickening effect. Excessively strong binding of the wetting and dispersing agent (a2) to the thickener surface is specifically not desired, in order not to make it unnecessarily difficult for component (b1) to displace the wetting and dispersing agent (a2) from the surface of the inorganic thickener (a1).

The aim, therefore, is to achieve adequate to very good reduction in viscosity by the wetting and dispersing agent (a2), but not a perfect dispersal of the inorganic thickener (a1), allowing the component (b1), in a second step, to enter into very good to perfect interaction with the surface of the inorganic thickener (a1), so that an increase in viscosity occurs.

The wetting and dispersing agent (a2) is preferably selected such that it has only a few groups with thickener affinity. In respect of the groups with thickener affinity, therefore, monofunctional wetting and dispersing agents (a2) can also be used advantageously. If they do not contain only one group with thickener affinity, it is advantageous for the groups with thickener affinity to be located spatially close to one another. The effect of this is that they are not capable of building up a pronounced stabilizing network.

For component (b1), in contrast, it counteracts the steric stabilization of the inorganic thickener (a1) by the wetting and dispersing agent, and enters into very good to perfect interaction with the thickener surface. Structural units entering into the calculation of the adhesion group fraction in the wetting and dispersing agent (a2) and/or in component (b1) are considered to be only the structural units reported in the "Adhesion groups" table below, which occur in different moieties in (a2) and (b1).

"Adhesion Groups" Table

| Structural element | Moiety in (a2) or (b1) | |
|---|---|---|
| C(O)N | Amide of secondary amines | |
| C(O)NH | Amide of primary amines | |
| C(O)NH$_2$ | Amide of ammonia | |
| OH | Alcohol | |
| N—C=N | Imidazoline | |
| NC(O)N | Urea of secondary amines | |
| HNC(O)NH | Urea of primary amines | |
| NH$_2$ | Primary amine | |
| NH | Secondary amine | |
| N | Tertiary amine | |
| XNH$_3$ | Ammonium salt of primary amines | where X is |
| XNH$_2$ | Ammonium salt of secondary amines* | the anion of |
| XNH | Ammonium salt of tertiary amines** | an acid group |
| OP(O)(OH)2 | Organic phosphoric ester | |
| C(O)OH | Carboxylic acid | |

*Example: ammonium carboxylate of secondary amine = COONH$_2$
**Example: ammonium chloride of tertiary amine = ClNH The calculation takes place typically starting from the starting compounds to be used for the synthesis of (a2) and (b1) and from the structural elements to be expected therefrom, in which case a 100% conversion may be assumed, or, in knowledge of the structure, the structural elements are derived from the compounds.

A general criterion for selection is that wetting and dispersing agents (a2) in comparison to the components (b1) possess a much smaller weight percentage fraction of adhesion groups, based on the total weight of the wetting and dispersing agent (a2), than is the case for the species of component (b1). Generally it has emerged that wetting and dispersing agents (a2) which can be used with preference in this invention possess a weight percentage fraction of structural elements of adhesion groups of preferably <11 wt % based on the total wetting and dispersing agent (a2), while in component (b1) the weight percentage fraction of structural elements of the adhesion groups is preferably ≥11 wt %.

These limits are not hard and fast, instead serving for a targeted selection of the appropriate components. For particularly preferred wetting and dispersing agents (a2) it is the case that the above structural element fraction is <9 wt %, more preferably <6 wt %, and very preferably <4 wt %, or even <3 wt %, while for preferred components (b1) the above structural element fraction is preferably >13 wt %, more preferably >20 wt %, very preferably indeed >30 wt % or even >40 wt %.

The structural element fraction in the wetting and dispersing agent (a2) ought, however, preferably to be not below 0.5 wt %, more preferably not below 0.8 wt %, since otherwise the thickening-inhibiting effect is inadequate owing to lack of affinity for the thickener surface.

The difference in the weight percentage fractions of structural elements in the wetting and dispersing agent (a2) relative to the weight percentage fraction of structural elements in components (b1) is preferably at least 2 wt %, more preferably at least 5 wt %, and very preferably at least 10 wt %.

In the above calculations, of course, only the wetting and dispersing agent (a2) and the component (b1) are included, respectively, in each case without any solvents present or other auxiliaries that may be present as a result of synthesis.

The gradation below may be taken as a general affinity series of different groups with surface affinity for typical thickener surfaces:

[Group 1]: imidazolines (amines, ammonium compounds)
[Group 2]: alcohols (ureas, amides, carboxylic acids, phosphoric esters), where the groups of group 1 generally have greater affinity for the thickener surface of the inorganic thickener (a1) than to those of group 2; in other words [group 1]>[group 2].

It is generally the case that groups with greater affinity are present preferably in component (b1), while the wetting and dispersing agents (a2) ought preferably to contain groups with less affinity.

It is the case, generally, that the wetting and dispersing agent (a2) and the component (b1) are selected such that they comprise one or more of the following functional groups selected from group 1: consisting of
  imidazolyl groups, with the structural element N—C=N,
  amino groups with the structural elements N for tertiary amines, NH for secondary amines, and NH$_2$ for primary amines, and
  ammonium groups with the structural element NH$^+$X$^-$ for ammonium salts of tertiary amines, with the structural element NH$_2$$^+$X$^-$ for ammonium salts of secondary amines, and NH$_3$$^+$X$^-$ for ammonium salts of primary amines, X$^-$ in each case being the anion of an acid;
and/or
group 2: consisting of
  hydroxyl groups with the structural element OH,
  urea groups with the structural element HNC(O)CNH for ureas of primary amines and NC(O)CN for ureas of secondary amines,
  amide groups, with the structural element C(O)N for amides of secondary amines, C(O)NH for amides of primary amines, and C(O)NH$_2$ for amides of ammonia,
  carboxylic acid groups with the structural element COOH, and
  organic phosphoric ester groups with the structural element OP(O) (OH)$_2$,
and
(A) the weight percentage fraction of structural elements in the wetting and dispersing agent (a2), selected from the functional groups of groups 1 and 2, based on the weight of the wetting and dispersing agent (a2), being lower than the weight percentage fraction of structural elements in component (b1), selected from the functional groups of groups 1 and 2, based on the weight of the component (b1); and/or
(B) component (b1) comprising a higher weight percentage fraction of structural elements from the functional groups selected from group 1, based on the weight of component (b1), than that of the structural elements from the functional groups selected from group 1 in the wetting and dispersing agent (a2), based on the weight of the wetting and dispersing agent (a2).

The selection rules make it possible on the one hand to select, reliably, suitable pairings of wetting and dispersing agents (a2), and components (b1) on the other hand. The extent of the increase in viscosity with component (b1) is dependent, however, on other factors, such as the structures of the wetting and dispersing agents (a2) and of the component (b1), for example, something which, however, is merely a matter of the extent of the effect, but does not jeopardize the performability of the invention.

Frequently and in general, the extent of the increase in viscosity can be raised by increasing the amount of component (b1) in relation to the wetting and dispersing agent (a2).

The weight ratio of the wetting and dispersing agent (a2) to the component (b1) is preferably about 25:1 to 1:10, more preferably 20:1 to 1:8, very preferably 15:1 to 1:6.

It is customarily the case, for the ratio of (a2) to (b1), that (a2) is used in excess, relative to the weight of the two components, in other words (a2):(b1)=>1:1, more preferably up to 15:1. If the increase of the thickening effect is not sufficient in such a case, it is advisable to increase the amount of (b1) up to a ratio of typically (a2):(b1)=1:5. It is of course also possible to raise the amount of (b1) beyond this ratio. In the latter case, however, it is advisable instead, optionally, to use a more potent component (b1), which has more functional groups and/or functional groups with greater thickener affinity.

Other Constituents of the Curing Agent Component 2

The curing agent component 2 as well may comprise other organic solvents and/or water, and also other additives of the kind customary in adhesives, sealants, coating materials, and molding compounds. In this regard, reference is made to the other constituents of the epoxy resin component, with the exception of the oxirane group-containing reactive diluents which, of course, may not be present in the curing agent component.

The two- or multicomponent systems of the invention are preferably adhesives, sealants, coating materials or molding compounds.

Typical fields of application for the epoxy resin-curing agent systems of the invention are the anticorrosion coating of large objects in shipbuilding, bridge construction, steel construction, pipeline construction and container construction, packaging coating and coatings in civil engineering, such as in the coating of buildings and industrial floors.

A further subject of the present invention is the use of the latent thickener in a formulation which is inert toward the latent thickener, in order to provide the formulation with a latent thickening effect. The formulation in question is preferably a component of a two- or multicomponent system.

The two- or multicomponent systems of the present invention are suitable generally for all substrates to be adhesively bonded, to be coated or to be sealed. As suitable substrate materials, mention may be made, by way of example, of glass, metals and their alloys, plastics such as, for example, also composite materials, painted surfaces, films and foils, paper and cardboard packaging, wood, Eternit, concrete, wovens such as, for example, fabrics or carpet materials, tiles and many other different materials.

The invention is described in more detail below, using examples.

EXAMPLES

Preparation Examples

In the case of molecularly nonuniform substances, the stated molecular weights—below and in the foregoing description—represent average values of the numerical average. The molecular weights, or number-average molecular weights $M_n$, are determined—where there are determinable functional end groups present such as hydroxyl, NCO, amino or acid groups—by end group determination via ascertainment of OH number, NCO number, amine number or acid number by titration, respectively. In the case of compounds for which end group determination is not applicable, the number-average molecular weight is determined by gel permeation chromography against a polystyrene standard. Molecular weights reported for the polyamines are number averages $M_n$ determined by ebullioscopy.

Unless otherwise stated, amounts in parts are parts by weight and amounts in percent are percentages by weight.

Viscosity Measurements

The viscosities of the base components and of the mixtures of the base components were determined—unless otherwise specified—on a Stresstech instrument from Rheologica via a plate-cone method (cone diameter 25 mm; cone angle: 1°; cone-plate gap: 35 μm; temperature: 23° C.; shear rate 1 $s^{-1}$; number of data points: 21; compensation time 10 s; measuring time per data point: delay time+integration time; delay time: 5-8 s; integration time: 3 s; control strength (sensitivity): 60%).

The measurements on two-, three- and multicomponent systems were carried out 2 minutes after their preparation.

The viscosities of the base components and of the mixtures of the base components were determined—where the Brookfield method is reported—on a Brookfield DV-II+ viscometer from Brookfield via spindle method (spindle 3; 5 rpm, temperature: 23° C.; measuring time per data point: 1 min). The measurements on two-, three- and multicomponent systems were carried out 2 minutes after their preparation.

Determination of Tertiary Nitrogen Content

The tertiary nitrogen content indicates the percentage content of bound tertiary basic nitrogen in a sample under analysis. The method of determination uses the fact that tertiary amino groups—in contrast to primary and secondary amino groups—do not react with anhydrides to form amides. When primary and secondary amino groups are acetylated with acetic anhydride, the tertiary amino groups can be subsequently titrated quantitatively with perchloric acid. For determining the tertiary nitrogen content of a sample, a quantity of a sample under analysis is weighed to a precision of 0.1 mg on an analytical balance into an 80 ml glass beaker. The quantity to be weighed out of the amount to be analyzed is guided by the anticipated tertiary nitrogen content and is taken from the table below:

| Anticipated tertiary nitrogen content [%] | Sample quantity to be weighed out [g] |
| --- | --- |
| 0-0.3 | 3-5 |
| 0.3-0.6 | 1.5-3 |
| 0.6-0.9 | 1.0-1.5 |
| 0.9-1.5 | 0.6-1.0 |
| 1.5-2.0 | 0.45-0.6 |
| 2.0-3.0 | 0.30-0.45 |
| 3-5 | 0.15-0.30 |

-continued

| Anticipated tertiary nitrogen content [%] | Sample quantity to be weighed out [g] |
|---|---|
| 5-10 | 0.08-0.15 |
| 10-20 | 0.06-0.08 |

The sample is dissolved in 20 ml of acetic acid (99.8% strength) and 30 ml of acetic anhydride (98.5% strength). The resulting sample solution is then fitted with a ground glass lid and heated in a thermoblock or waterbath at 70° C. for a time of 30 minutes. When the sample solution has cooled, it is placed on a magnetic stirrer and an Ag/AgCl combination electrode is immersed into the sample solution. The combination electrode is part of a microprocessor-controlled analytical apparatus (Titrator DL77, DL70 ES or DL67) from Mettler. The sample solution is titrated with perchloric acid (0.1 N in acetic acid, anhydride-free). The tertiary nitrogen content is determined by the analytical apparatus used. The tertiary nitrogen content is calculated as follows:

$$\text{Tertiary } N \text{ content (wt \%)} = \frac{\text{consumption ml} \times N \times f \times 1.4008}{\text{initial mass in g}}$$

N=normality of the titrant
f=factor of the titrant

The factor f here takes account where appropriate of any deviation in the titrant used from a normality of 0.1 N.

Inorganic Thickeners (a1)

Inorganic thickeners used were two different kinds of commercially available fumed silica (available from Evonik Industries) which differ in their BET surface area, namely:
(a1.1)=Aerosil® 200 (BET 200) and
(a1.2)=Aerosil® 380 (BET 380).

Also used were three different modified phyllosilicate mixtures, available commercially from Byk Chemie GmbH under the brand name Garamite®, namely:
(a1.3)=Garamite® 7305 (mixture of different bentonites, modified with quaternary ammonium compounds)
(a1.4)=Garamite® 1210 (mixture of different bentonites, modified with quaternary ammonium compounds)
(a1.5)=Garamite® 1958 (mixture of different bentonites, modified with quaternary ammonium compounds)

Wetting and Dispersing Agents (a2)
Preparation of (a2.1)
Precursor A 30 g of Epomin SP-018 (from Nippon Shokubai) are heated to 80° C. Over a period of two hours, 70 g of 2-ethylhexyl acrylate are added dropwise, after which reaction is allowed to continue for six hours.

Precursor B

92% of polyether (butanol-started EO/PO polyether (about 1:1), Mw about 1100 Da) is heated to 60° C. 7.6 g of polyphosphoric acid are slowly added dropwise. The reaction mixture is stirred for six hours until there is no further rise in the acid number (acid number as per DIN EN ISO 2114) in the flask.

Synthesis of the Compound from Precursors A and B 20 g of precursor A are introduced at 60° C. and 80 g of precursor B are metered in slowly over a period of two hours. The reaction mixture is stirred at 60° C. for five hours.

The product obtained has an active substance content of 100%.

Preparation of (a2.2)

A reaction vessel was charged with 205 g of tetrahydrofuran, and 0.11 ml of 1M tetrabutylammonium 3-chlorobenzoate in acetonitrile and 1.94 g of 1-methoxy-1-trimethylsiloxy-2-methylpropane are added. The reaction vessel was cooled to −10° C. In parallel to an addition over 40 minutes of a mixture consisting of 39.6 g of 2-ethylhexyl methacrylate, 20 g of methyl methacrylate and 2.84 g of butyl methacrylate, a dilution of 0.22 ml of 1M tetrabutylammonium 3-chlorobenzoate in acetonitrile in 5 ml of tetrahydrofuran was added over a period of one hour. At no point did the reaction temperature exceed the temperature of 25° C.

Then 20.9 g of N,N-dimethylaminoethyl methacrylate were added dropwise over a period of 10 minutes, and in parallel a further 0.11 ml of 1M tetrabutylammonium 3-chlorobenzoate in acetonitrile was metered in over a period of 10 minutes. After a further three hours of stirring at a temperature (23° C.), 5 ml of methanol were added. Following addition of 6.7 g of benzyl chloride, stirring is carried out at 60° C. for a further six hours.

Methoxypropyl acetate is then added to the product, and the tetrahydrofuran present is removed by distillation, and the fraction of nonvolatiles (2.0±0.1 g test substance, duplicate determination, 10 minutes, 150° C.; EN ISO 3251) is adjusted to 40%.

Preparation of (a2.3)
Precursor A 100 g of dimethylolpropionic acid (from Perstorp), 255.26 g of ε-caprolactone and 74.64 g of δ-valerolactone were admixed with dibutyltin dilaurate (200 ppm) and stirred under inert gas at 170° C. until the fraction of nonvolatiles (2.0±0.1 g test substance, duplicate determination, 10 minutes, 150° C.; EN ISO 3251) exceeded a figure of 98%.

Precursor B 435 g of Desmodur T100 (from Bayer) are introduced under nitrogen and 1100 g of the dry (Karl Fischer water content <0.1%) polyether (butanol-started PO polyether, Mw about 1100 Da) are added slowly dropwise such that the reaction temperature does not exceed 60° C. After the end of the addition, stirring is continued at 60° C. until the NCO number of the product shows no significant change over a period of 30 minutes.

Then the remaining excess of Desmodur T100 is removed by distillation using a thin-film or short-path evaporator.

Synthesis of the Compound from Precursors A and B 1.2 g of Epomin SP200 (from Nippon Shokubai) are heated together with 59.0 g of precursor A to 180° C. under nitrogen. The batch was stirred at this temperature until the acid number (AN as per DIN 53402) reached a figure of 8.4 mg KOH/g substance. During the reaction, the water of reaction formed was distilled off at the reaction temperature selected and was collected in a water separator. Then the hydroxyl number (as per DIN/ISO 4629) of the resulting product was determined, and 50% of the hydroxyl groups were reacted at a temperature at 60° C. by addition of precursor B and four-hour stirring under nitrogen.

The product is obtained as a brown oil of high viscosity, the active substance concentration being 100%.

Preparation of (a2.4)
Precursor A 100 g of dimethylolpropionic acid (from Perstorp), 255.26 g of ε-caprolactone and 74.64 g of δ-valerolactone were admixed with dibutyltin dilaurate (200 ppm) and stirred under inert gas at 170° C. until the fraction of nonvolatiles (2.0±0.1 g test substance, duplicate determination, 10 minutes, 150° C.; EN ISO 3251) exceeded a figure of 98%.

Precursor B 435 g of Desmodur T100 (from Bayer) are introduced under nitrogen and 1100 g of the dry (Karl Fischer water content <0.1%) polyether (butanol-started PO polyether, Mw about 1100 Da) are added slowly dropwise such that the reaction temperature does not exceed 60° C. After the end of the addition, stirring is continued at 60° C. until the NCO number of the product shows no significant change over a period of 30 minutes.

Then the remaining excess of Desmodur T100 is removed by distillation using a thin-film or short-path evaporator.

Synthesis of the Compound from Precursors A and B 1.2 g of Epomin SP200 (from Nippon Shokubai) are heated together with 59.0 g of precursor A to 180° C. under nitrogen. The batch was stirred at this temperature until the acid number (AN as per DIN 53402) reached a figure of 7.8 mg KOH/g substance. During the reaction, the water of reaction formed was distilled off at the reaction temperature selected and was collected in a water separator. Then the hydroxyl number (as per DIN/ISO 4629) of the resulting product was determined, and 50% of the hydroxyl groups were reacted at a temperature at 60° C. by addition of precursor B and four-hour stirring under nitrogen.

The resulting product is subsequently diluted for further use to 80% in methoxypropyl acetate.

Preparation of (a2.5)

Precursor A 134 g of dimethylolpropionic acid (from Perstorp), 342 g of ε-caprolactone and 100 g of δ-valerolactone were admixed with dibutyltin dilaurate (200 ppm) and stirred under inert gas at 170° C. until the fraction of nonvolatiles (2.0±0.1 g test substance, duplicate determination, 10 minutes, 150° C.; EN ISO 3251) exceeded a figure of 98%.

Precursor B 435 g of Desmodur T100 (from Bayer) are introduced under nitrogen and 1100 g of the dry (Karl Fischer water content <0.1%) polyether (butanol-started PO polyether, Mw about 1100 Da) are added slowly dropwise such that the reaction temperature does not exceed 60° C. After the end of the addition, stirring is continued at 60° C. until the NCO number of the product shows no significant change over a period of 30 minutes.

Then the remaining excess of Desmodur T100 is removed by distillation using a thin-film or short-path evaporator.

Synthesis of the Compound from Precursors A and B 10 g of Epomin SP006 (from Nippon Shokubai) are heated together with 550 g of precursor A to 180° C. under nitrogen. The batch was stirred at this temperature until the acid number (AN as per DIN 53402) reached a figure of 10.3 mg KOH/g substance. During the reaction, the water of reaction formed was distilled off at the reaction temperature selected and was collected in a water separator. Then the hydroxyl number (as per DIN/ISO 4629) of the resulting product was determined, and 50% of the hydroxyl groups were reacted at a temperature at 60° C. by addition of precursor B and four-hour stirring under nitrogen.

The resulting product is subsequently diluted for further use to 80% in benzyl alcohol.

Preparation of (a2.6)

250 g of polyether (methanol-started EO polyether, Mw about 500 Da) are admixed with 181 g of ε-caprolactone and heated to 80° C. Then 1000 ppm of toluenesulfonic acid are added. The reaction mixture is stirred until the fraction of nonvolatiles (2.0±0.1 g test substance, duplicate determination, 10 minutes, 150° C.; EN ISO 3251) exceeds a figure of 98%. then 650 ppm of dibutylethanolamine are added and the reaction mixture is stirred for 10 minutes more.

51 g of polyphosphoric acid are metered in. The reaction mixture is stirred for three hours until the acid number (acid number as per DIN EN ISO 2114) in the flask shows no further increase. Then 5 g of water, 900 g of methoxypropyl acetate and 19 g of magnesium oxide are added and the reaction mixture is homogenized at 100° C. for an hour. Excess water is removed under reduced pressure until the Karl-Fischer water content (as per DIN 51777) reaches a figure <0.2%.

The active substance content is subsequently adjusted to a level of 40%, by determination of the fraction of nonvolatiles (2.0±0.1 g test substance, duplicate determination, 10 minutes, 150° C.; EN ISO 3251).

Preparation of (a2.7)

30 g of Epomin SP-018 (from Nippon Shokubai) are heated to 80° C. Over a period of two hours, 70 g of 2-ethylhexyl acrylate are added dropwise, after which reaction is allowed to continue for six hours.

The resulting product has an active substance concentration of 100%.

Preparation of (a2.8)

65 g of synthetic resin SMA 2000 (styrene-maleic anhydride copolymer, 187 mmol of anhydride groups, from Cray Valley) are diluted in 100 g of methoxypropyl acetate and admixed slowly with a mixture of 105 g of Jeffamin M2070 (amine-terminated EO/PO polyether, from Huntsman) and 10.2 g of N,N-dimethylaminopropylamine and heated at 170° C. for four hours. During this time the methoxypropyl acetate present is removed by distillation. Then 8.9 g of benzyl chloride are added at 70° C. and the batch is reacted for eight hours.

The product obtained is admixed with a mixture of methoxypropyl acetate and butyl glycol (ratio 1:1, by weight) until the active substance content is 40%.

Preparation of (a2.9)

65 g of synthetic resin SMA 2000 (styrene-maleic anhydride copolymer, 187 mmol of anhydride groups, from Cray Valley) are diluted in 100 g of methoxypropyl acetate and admixed slowly with a mixture of 105 g of Jeffamin M2070 (amine-terminated EO/PO polyether, from Huntsman) and 10.2 g of N,N-dimethylaminopropylamine and heated at 170° C. for four hours. During this time the methoxypropyl acetate present is removed by distillation.

The product obtained is admixed with a mixture of methoxypropyl acetate and butyl glycol (ratio 1:1, by weight) until the active substance content is 40%.

Preparation of (a2.10)

Precursor A

A reaction vessel was charged with 205 g of tetrahydrofuran, and 0.11 ml of 1M tetrabutylammonium 3-chlorobenzoate in acetonitrile and 1.94 g of 1-methoxy-1-trimethylsiloxy-2-methylpropane were added. The reaction mixture was cooled to −10° C. In parallel to an addition over 40 minutes of a mixture consisting of 39.6 g of 2-ethylhexyl methacrylate, 20 g of methyl methacrylate and 2.84 g of butyl methacrylate, a dilution of 0.22 ml of 1M tetrabutylammonium 3-chlorobenzoate in acetonitrile in 5 ml of tetrahydrofuran was added over a period of one hour. At no point did the reaction temperature exceed the temperature of 25° C.

Then 20.9 g of N,N-dimethylaminoethyl methacrylate were added dropwise over a period of 10 minutes, and in parallel a further 0.11 ml of 1M tetrabutylammonium 3-chlorobenzoate in acetonitrile was metered in over a period of 10 minutes.

After a further three hours of stirring at room temperature (23° C.), 5 ml of methanol were added.

Precursor B 87 g of polyether (butanol-started PO polyether, Mw about 700 Da) is heated to 60° C. 13 g of polyphosphoric acid are slowly added dropwise. The reaction mixture is stirred for six hours until there is no further rise in the acid number (acid number as per DIN EN ISO 2114) in the flask.

Synthesis of the Compound from Precursors A and B 120 g of precursor A are admixed with 50 g of polyether (methanol-started EO polyether, Mw about 350) and the solvent present is distilled off under reduced pressure. The remaining batch is then heated to 60° C., 14 g of precursor B are added, and the mixture is stirred at this temperature for eight hours.

The product obtained has an active substance concentration of 50%.

Preparation of (a2.11)

15.2 g of alpha-methylstyrene dimer are introduced in 120 g of methoxypropyl acetate and heated to 120° C. 100 g of dimethylaminoethyl methacrylate and 1.5 g of AIBN in solution in 10 g of methoxypropyl acetate are metered in parallel over a period of 60 minutes, after which reaction is allowed to continue for 30 minutes. Then a mixture of 60 g of methyl methacrylate, 20 g of 2-ethylhexyl methacrylate, 50 g of 2-ethylhexyl acrylate and 230 g of butyl acrylate is metered in parallel to a solution of 37.2 g of AIBN in 240 g of methoxypropyl acetate over a period of 150 minutes, after which reaction is allowed to continue for 30 minutes.

Then 100 g of dimethylaminoethyl methacrylate and, in parallel, 1.2 g of AIBN in solution in 10 g of methoxypropyl acetate are metered in over a period of 60 minutes, after which reaction is allowed to continue for 30 minutes.

After a further addition of 0.4 g of AIBN in solution in 5 g of methoxypropyl acetate, over a period of 15 minutes, reaction is allowed to continue for 60 minutes.

The product obtained has an active substance content of 60%.

Preparation of (a2.12)

Precursor A 15 g of tall oil fatty acid (acid number: 186 mg KOH/g substance) and 10 g of polyethylene glycol 200 are heated together slowly at 200° C. until water which forms can no longer be collected. Reduced pressure (beginning at atmospheric pressure, slow reduction to 60 mbar) is applied for 2 hours. Then 4 g of maleic anhydride are added. Reaction is allowed to take place for an hour at 200° C.

Precursor B 17 g of tall oil fatty acid (acid number: 186 mg KOH/g substance) and 3.0 g of diethylenetriamine are combined and heated at 170° C. for four hours. Water of reaction produced is removed by distillation, followed by stirring under reduced pressure (60 mbar) for a further two hours.

Then 2 g of water are added and the mixture is stirred at 95° C. for 30 minutes until the tertiary nitrogen content (see description of method) is no longer detectable. Then again reduced pressure (60 mbar) is applied and excess water is removed by distillation until the Karl-Fischer water content (as per DIN 51777) reaches a figure <0.4%.

Synthesis of the Compound from Precursors A and B 25 g of precursor A and 20 g of precursor B are stirred homogeneously together with 45 g of Isopar G (hydrogenated C10-C12 isoalkanes, <2% aromatic content) at 80° C. for an hour.

The product obtained has an active substance content of 50%.

Preparation of (a2.13)

Precursor A 88 g of Lutensol AO11 (fatty alcohol-started EO polyether from BASF SE) are admixed with 0.05 g of potassium carbonate and heated to 100° C. Subsequently, 12 g of maleic anhydride are added and the mixture is stirred at this temperature for three hours.

Precursor B 270 g of methoxypropyl acetate and 18 g of alpha-methylstyrene are heated to 120° C. In parallel, 300 g of butyl methacrylate and a solution of 7.2 g of AIBN in 40.8 g of methoxypropyl acetate are metered in over a period of two hours. After further reaction for a period of 30 minutes, in parallel, 163 g of N,N-dimethylaminoethyl methacrylate and a solution of 1.43 g of AIBN in 8.2 g of methoxypropyl acetate are metered in over a period of one hour. After further reaction for a period of 30 minutes, a solution of 1.4 g of AIBN in 8 g of methoxypropyl acetate is metered in over a period of 15 minutes and the mixture is stirred for a further hour.

Synthesis of the Compound from Precursors A and B 40 g of precursor B, 20 g of precursor A and 13.3 g of methoxypropyl acetate are stirred together at 120° C. for five hours.

The product obtained has an active substance content of 60%.

Preparation of (a2.14)

Precursor A 100 g of dimethylolpropionic acid (from Perstorp), 255.26 g of ε-caprolactone and 74.64 g of δ-valerolactone were admixed with dibutyltin dilaurate (200 ppm) and stirred under inert gas at 170° C. until the fraction of nonvolatiles (2.0±0.1 g test substance, duplicate determination, 10 minutes, 150° C.; EN ISO 3251) exceeded a figure of 98%.

Precursor B 435 g of Desmodur T100 (from Bayer) are introduced under nitrogen and 1100 g of the dry (Karl Fischer water content <0.1%) polyether (butanol-started PO polyether, Mw about 1100 Da) are added slowly dropwise such that the reaction temperature does not exceed 60° C. After the end of the addition, stirring is continued at 60° C. until the NCO number of the product shows no significant change over a period of 30 minutes.

Then the remaining excess of Desmodur T100 is removed by distillation using a thin-film or short-path evaporator.

Synthesis of the Compound from Precursors A and B 1.2 g of Epomin SP200 (from Nippon Shokubai) are heated together with 59.0 g of precursor A to 180° C. under nitrogen. The batch was stirred at this temperature until the acid number (AN as per DIN 53402) reached a figure of 9.6 mg KOH/g substance. During the reaction, the water of reaction formed was distilled off at the reaction temperature selected and was collected in a water separator. Then the hydroxyl number (as per DIN/ISO 4629) of the resulting product was determined, and 50% of the hydroxyl groups were reacted at a temperature at 60° C. by addition of precursor B and four-hour stirring under nitrogen. The resulting product is subsequently diluted for further use to 80% in benzyl alcohol.

Component (b1)

Preparation of (b1.1)

881 g of a mixture of polymerized fatty acids having a trimerized fatty acid fraction of >75 wt %, based in each case on the total weight of the mixture, with an acid number of 191 mg KOH/g substance (Pripol 1040, from Croda) are admixed with 438 g of triethylenetetramine (CAS No.: 112-24-3) and 400 ml of solvent naphtha (aromatic hydrocarbon fraction, boiling range of 150° C. to 210° C.) and heated to 150° C. until the stream of distillate which occurs subsides significantly. This is followed by heating at 190° C. for 6 hours and application at reduced pressure (about 500 mbar) until a total of 108 g of water have separated out.

The resulting product is admixed with benzyl alcohol until the nonvolatiles fraction obtained (2.0±0.1 g test substance, duplicate determination, 20 minutes, 150° C.; EN ISO 3251) is 70-75 wt %.

Preparation of (b1.2)

400 g of Lupasol P (polyethyleneimine from BASF SE, 50% form) are admixed with 600 g of benzyl alcohol and then freed from the water by distillation at 100° C. under reduced pressure (slow reduction of the pressure from atmospheric pressure to 30 mbar) until distillate is no longer obtained. Then, under an inert gas atmosphere, 200 g of tall oil fatty acid (acid number: 186 mg KOH/g substance) are added and the batch is reacted at 140° C. for three hours.

A pale yellow product having an active substance content of 40% is obtained.

Preparation of (b1.3)

According to patent specification DE3706860A1, example 8 referred to therein is synthesized. In deviation from the protocol there, dilution takes place not to 50% in cyclohexanone but instead to 50% in solvent naphtha (aromatic hydrocarbon fraction, boiling range of 150° C. to 210° C.)

Preparation of (b1.4)

800 g of Lupasol P (polyethyleneimine from BASF SE, 50% form) are admixed with 400 g of benzyl alcohol and then freed from the water by distillation at 100° C. under reduced pressure (slow reduction of the pressure from atmospheric pressure to 30 mbar) until distillate is no longer obtained. Then, under an inert gas atmosphere, 200 g of tall oil fatty acid (acid number: 186 mg KOH/g substance) are added and the batch is reacted at 140° C. for three hours.

A pale yellow product having an active substance content of 60% is obtained.

Preparation of (b1.5)

600 g of Lupasol P (polyethyleneimine from BASF SE, 50% form) are admixed with 300 g of benzyl alcohol and then freed from the water by distillation at 100° C. under reduced pressure (slow reduction of the pressure from atmospheric pressure to 30 mbar) until distillate is no longer obtained. Then, under an inert gas atmosphere, 120 g of tall oil fatty acid (acid number: 186 mg KOH/g substance) are added and the batch is reacted at 140° C. for three hours.

A pale yellow product having an active substance content of 58% is obtained.

Components (b1.x) below are available commercially:

Component (b1.6)

Lupasol P, polyethyleneimine from BASF SE, Mw about 750 000 Da (active substance content: 50 wt %)

Component (b1.7)

Tween 20, polyoxyethylene(20)-sorbitan monolaurate

Component (b1.8)

Triethylenetetramine

Component (b1.9)

Isophoronediamine, isomer mixture

Component (b1.10)

Diglycolamine

Component (b1.11)

Jeffamine T-403, polyetheramine from Huntsman

Use Examples

Described below is the production of inventive two-component systems obtained from in each case two base components by mixing—as indicated below. Unless indicated otherwise, not only the commercial products but also the inorganic thickeners (a1.x), the wetting and dispersing agents (a2.x), and the components (b1.x) are used in the form of the commercial product or synthesis product. The quantities (in g) therefore relate to the respective commercial and synthesis products, including any solvents present and/or including any auxiliaries present as a result of the production process and not removed.

List of Commercial Products Used in the Use Examples

EPON Resin 828: Epoxy binder based on bisphenol A/epichlorohydrin, from Momentive.

EPIKOTE Resin 1001X75: 75% solid-resin solution in xylene of a solid epoxy binder based on bisphenol A/epichlorohydrin from Momentive.

Epikure 8545-W-52 Nonionic, water-thinnable modified amine adduct from Momentive Epikote 816 MV Bisphenol A resin in a monofunctional reactive diluent, from Momentive HELOXY™ Modifier HD: Reactive diluent based on hexane-1,6-diol diglycidyl ether, from Momentive.

HELOXY™ Modifier Z8: Reactive diluent based on a monofunctional aliphatic glycidyl ether based on a C12/C14 fatty alcohol, from Momentive.

BYK®-A 530: Silicon-containing and polymer-containing deaerating agent from BYK-Chemie GmbH, 95%.

BYK-LP D 22185: Silicon-containing and polymer-containing deaerating agent in reactive solvent, from BYK-Chemie GmbH.

BYK-9076: Solvent-free wetting and dispersing additive for stabilizing organic and inorganic pigments, from BYK-Chemie GmbH.

CeTePox 1393-02 H: Amine curing agent for epoxide systems, from CTP GmbH, mixture of isophoronediamine, m-xylylenediamine, benzyl alcohol, salicylic acid, and nonylphenol (H-equivalent: 93)

CeTePox 240 R: Epoxy binder based on bisphenol A/bisphenol F epichlorohydrin from CTP GmbH.

Jeffamine XTJ 568: Amine curing agent (monoethylene glycol polybutylene oxide diamine, H-equivalent: 55) for epoxy systems, from Huntsman EPIKURE 3155: Amine curing agent for epoxy systems, from Momentive, reaction product (modified polyamide based on dimerized fatty acid and polyamines, H-equivalent: 133)

Dowanol PM: Monopropylene glycol monomethyl ether from Dow Chemical Company

Bayferrox 130M: Red iron oxide pigment from Lanxess Deutschland GmbH

Micro Talk AT 1: Micronized talc from Norwegian Talk Deutschland GmbH

Heucophos ZPA: Zinc aluminum orthophosphate hydrate from Heubach GmbH
EWO: Heavy spar from Sachtleben Chemie GmbH
Nonaqueous Epoxy Resin-Amine Curing Agent Systems
Preparation of Base Components SK.A to SK.H and SK.J The individual constituents are mixed in the quantities indicated in tables 1 to 6 with stirring at room temperature (23° C.) using the Pendraulik TD 100 dissolver with a toothed disk at 2 m/s and then stirred for homogenization for 1 minute at 5 m/s, 1 minute at 10 m/s, and 1 minute at 15 m/s.

Preparation of Base Component SK.I

Epikote 1001 X 75, xylene, Dowanol PM, BYK-A 530 and BYK-9076 are mixed by hand for one minute with stirring, then the remaining components (see table 12) are added and homogenized with the Pendraulik TD 100 dissolver with a toothed disk at 12 m/s for 10 minutes.

Production of Semi-Finished Products by Combination of Base Components SK.A and SK.B, SK.C and SK.D, SK.E and SK.F, SK.G and SK.H, and SK.I and SK.J:

The two base components SK.A and SK.B (and, respectively SK.C and SK.D; SK.E and SK.F; SK.G and SK.H; and SK.I and SK.J) are combined and homogenized with the Pendraulik TD 100 dissolver with a toothed disk at 2 m/s for 1 minute.

The viscosities reported in table 7 were measured for the individual base components after cooling to room temperature (23° C.). The viscosities of the multicomponent mixtures mixed from the base components were measured 2 minutes after they had been produced.

TABLE 1

(quantities in g)

| Constituents | Comp. ex. V1 | | Comp. ex. V2 | | Comp. ex V3 | |
| --- | --- | --- | --- | --- | --- | --- |
| | SK.A | SK.B | SK.A | SK.B | SK.A | SK.B |
| EPON Resin 828 | 75.6 | | 75.6 | | 75.6 | |
| HELOXY Modifier HD | 18.9 | | 18.9 | | 18.9 | |
| BYK-A 530 | 0.5 | | 0.5 | | 0.5 | |
| (a1.1) | 5.0 | | 5.0 | | 5.0 | |
| (a2.2) | 0.0 | | 0.0 | | 3.0 | |
| CeTePox 1393-02 H | | 49.2 | | 49.2 | | 49.2 |
| (b1.1) | | 0.0 | | 1.0 | | 1.5 |

TABLE 2

(quantities in g)

| Constituents | Example 1 | | Example 2 | | Example 3 | | Example 4 | | Example 5 | |
| --- | --- | --- | --- | --- | --- | --- | --- | --- | --- | --- |
| | SK.A | SK.B | SK.A | SK.B | SK.A | SK.B | SK.A | SK.B | SK.A | SK.B |
| EPON Resin 828 | 75.6 | | 75.6 | | 75.6 | | 75.6 | | 75.6 | |
| HELOXY Modifier HD | 18.9 | | 18.9 | | 18.9 | | 18.9 | | 18.9 | |
| BYK-A 530 | 0.5 | | 0.5 | | 0.5 | | 0.5 | | 0.5 | |
| (a1.1) | 5.0 | | 5.0 | | 5.0 | | 5.0 | | 5.0 | |
| (a2.x) | $3.0^1$ | | $3.0^2$ | | $3.0^3$ | | $3.0^4$ | | $3.0^5$ | |
| CeTePox 1393-02 H | | 49.2 | | 49.2 | | 49.2 | | 49.2 | | 49.2 |
| (b1.x) | | 1.5* | | 1.0** | | 1.0** | | 1.0** | | 1.0** |

$^1$ = (a2.4);
$^2$ = (a2.8);
$^3$ = (a2.1);
$^4$ = (a2.13);
$^5$ = (a2.14);
* = (b1.1);
** = (b1.5)

TABLE 3

(quantities in g)

| Constituents | Example 6 | | Example 7 | | Example 8 | | Example 9 | |
| --- | --- | --- | --- | --- | --- | --- | --- | --- |
| | SK.C | SK.D | SK.C | SK.D | SK.C | SK.D | SK.C | SK.D |
| CeTePox 240 R | 80.32 | | 80.32 | | 80.32 | | 80.32 | |
| HELOXY Modifier HD | 14.18 | | 14.18 | | 14.18 | | 14.18 | |
| BYK-A 530 | 0.5 | | 0.5 | | 0.5 | | 0.5 | |
| (a1.2) | 5.0 | | 5.0 | | 5.0 | | 5.0 | |
| (a2.x) | $5.0^1$ | | $5.0^1$ | | $3.0^2$ | | $5.0^3$ | |
| CeTePox 1393-02 H | | 51.85 | | 51.85 | | 51.85 | | 51.85 |
| (b1.x) | | 0.5** | | 1.5* | | 0.5** | | 0.5** |

$^1$ = (a2.14);
$^2$ = (a2.1);
$^3$ = (a2.4);
* = (b1.1);
** = (b1.5)

TABLE 4

(quantities in g)

| | Example 10 | |
|---|---|---|
| Constituents | SK.E | SK.F |
| CeTePox 240 R | 80.32 | |
| BYK-LP D 22185 | 0.5 | |
| (a1.3) | 5.0 | |
| (a2.8) | 1.0 | |
| m-xylylenediamine | | 17.99 |
| (b1.5) | | 0.5 |

TABLE 5

(quantities in g)

| | Example 11 | |
|---|---|---|
| Constituents | SK.G | SK.H |
| EPON Resin 828 | 77.01 | |
| HELOXY Modifier Z8 | 13.58 | |
| BYK-LP D 22185 | 0.49 | |
| (a1.1) | 6.86 | |
| (a1.3) | 2.06 | |
| (a2.14) | 6.0 | |
| Jeffamine XTJ 568 | | 25.41 |
| (b1.5) | | 1.0 |

TABLE 6

(quantities in g)

| | Example 12 | | Example 13 | |
|---|---|---|---|---|
| Constituents | SK.I | SK.J | SK.I | SK.J |
| Epikote 1001 X 75 | 31.08 | | 31.08 | |
| BYK-A 530 | 0.50 | | 0.50 | |
| BYK-9076 | 0.85 | | 0.85 | |
| Xylol | 8.11 | | 8.11 | |
| Dowanol PM | 6.76 | | 6.76 | |
| Bayferrox 130M | 4.70 | | 4.70 | |
| Micro Talk AT 1 | 12.00 | | 12.00 | |
| Heucophos ZPA | 20.00 | | 20.00 | |
| EWO | 14.00 | | 14.00 | |
| (a1.1) | 2.0 | | 2.0 | |
| (a2.x) | 1.2[1] | | 1.2[2] | |
| Epikure 3155 | | 8.68 | | 8.68 |
| (b1.5) | | 0.2 | | 0.2 |

[1] = (a2.4);
[2] = (a2.14)

TABLE 7

| Comp. ex. | Viscosity* SK.A without (a2.x) | Viscosity* SK.A | Viscosity loss SK.A in % | Viscosity* SK.B | Viscosity* SK.A + SK.B | Viscosity increase[1] in % |
|---|---|---|---|---|---|---|
| 1 | 201 | ./. | ./. | 0.3 | 2.5 | ./. |
| 2 | 201 | ./. | ./. | 0.3 | 119 | ./. |
| 3 | 201 | 4.1 | 98 | 0.3 | 2.3 | −44 |

| Ex. | Viscosity* SK.A without (a2.x) | Viscosity* SK.A | Viscosity loss SK.A in % | Viscosity* SK.B | Viscosity* SK.A + SK.B | Viscosity increase[1] in % |
|---|---|---|---|---|---|---|
| 1 | 201 | 22 | 89 | 0.3 | 124 | 464 |
| 2 | 201 | 2.2 | 99 | 0.3 | 153 | 6855 |
| 3 | 201 | 2.6 | 99 | 0.3 | 195 | 7400 |
| 4 | 201 | 5.5 | 97 | 0.3 | 146 | 2555 |
| 5 | 201 | 9.3 | 95 | 0.3 | 191 | 1954 |

| Ex. | Viscosity* SK.C without (a2.x) | Viscosity* SK.C | Viscosity loss SK.C in % | Viscosity* SK.D | Viscosity* SK.C + SK.D | Viscosity increase[2] in % |
|---|---|---|---|---|---|---|
| 6 | 294 | 8.7 | 97 | 0.3 | 171 | 1866 |
| 7 | 294 | 8.7 | 97 | 0.3 | 89 | 923 |
| 8 | 294 | 4.1 | 98 | 0.3 | 191 | 4558 |
| 9 | 294 | 98.6 | 66 | 0.3 | 161 | 68 |

| Ex. | Viscosity* SK.E without (a2.x) | Viscosity* SK.E | Viscosity loss SK.E in % | Viscosity* SK.F | Viscosity* SK.E + SK.F | Viscosity increase[3] in % |
|---|---|---|---|---|---|---|
| 10 | 328 | 8.4 | 97 | 12 | 166 | 1876 |

| Ex. | Viscosity* SK.G without (a2.x) | Viscosity* SK.G | Viscosity loss SK.G in % | Viscosity* SK.H | Viscosity* SK.G + SK.H | Viscosity increase[4] in % |
|---|---|---|---|---|---|---|
| 11 | 768 | 120 | 84 | 11 | 763 | 536 |

| Ex. | Viscosity* SK.I without (a2.x) | Viscosity* SK.I | Viscosity loss SK.I in % | Viscosity* SK.J | Viscosity* SK.I + SK.J | Viscosity increase[5] in % |
|---|---|---|---|---|---|---|
| 12 | 80.6 | 46.3 | 43 | 4.3 | 247 | 433 |
| 13 | 80.6 | 62.9 | 22 | 4.3 | 305 | 385 |

*in pascal-seconds;
[1] relative to SK.A;
[2] relative to SK.C;
[3] relative to SK.E;
[4] relative to SK.G;
[5] relative to SK.I In comparative example V1, the base components SK.A and SK.B were prepared without the compounds (a2) and (b1).

It is found that the viscosity of the thixotroped base component SK.A is very high and the viscosity when the curing agent (base component SK.B) is added to the resin collapses considerably.

In comparative example V2, the base component SK.A was prepared without wetting and dispersing agent (a2), and base component SK.B was prepared with 1.0 g of the polymer (b1) (here: (b1.1)). It is found that the viscosity of both the base component SK.A and the mixture of base components SK.A and SK.B is very high.

In comparative example V3, the base component SK.A was prepared with the wetting and dispersing agent (a2) (here: (a2.2)) and the base component SK.B was prepared with 1.5 g of the polymer (b1) (here: (b1.1)). It is found that, despite the addition of a compound (b1), structural buildup of the silica no longer takes place, which means that the viscosity of the mixture of base components SK.A and SK.B remains low.

In the inventive examples 1 to 13, different two-component systems were prepared from the constituents listed in tables 2 to 6, in the quantities indicated in the tables in each case.

The viscosity of the thixotroped base components SK.A, SK.C, SK.E, SK.G, and SK.I is significantly lower, as a result of using the respective wetting and dispersing agent (a2.x), than in the case of the respective base component without the respective wetting and dispersing agent (a2.x). The addition of the wetting and dispersing agent to the base components SK.A, SK.C, SK.E, SK.G, and SK.I leads to a viscosity reduction (viscosity loss) of 22% (example 13) up to 99% (examples 2 and 3). The non-thixotroped base components (curing components) nevertheless containing the polymer (b1.x), SK.B, SK.D, SK.F, SK.H, and SK.J, have low viscosities before being mixed with their respective complementary base components SK.A, SK.C, SK.E, SK.G, and SK.I. On account of the low initial viscosities of the supplemented base components, they can be processed well and in particular can be mixed thoroughly and homogeneously. The viscosities of the two-component systems as achieved two minutes after mixing of the mutually corresponding base components far exceed the viscosities of the base components SK.A, SK.C, SK.E, SK.G, and SK.I supplemented with the additive combination (a1.x) and (a2.x). The corresponding viscosity increase of the base components SK.B, SK.D, SK.F, SK.H, and SK.J supplemented with component (b1.x) is from 68% (example 9) to 7400% (example 3).

Aqueous Epoxy Resin/Amine Curing Agent Systems

Described below is the production of aqueous two-component systems of the invention obtained from in each case two base components by mixing—as indicated below.

Preparation of Base Component SK.K

The individual constituents are added in succession in the quantities indicated in table 8, with stirring at room temperature (23° C.) using the Pendraulik TD 100 dissolver with a toothed disk at 2 m/s, and then are stirred for homogenization for a further minute at 5 m/s, 1 minute at 10 m/s, and 1 minute at 15 m/s.

Preparation of Base Component SK.L

The amine curing agent (Epikure 8545-W-52) and also the polymer (b1.2) are admixed with the water with stirring at room temperature (23° C.) using the Pendraulik TD 100 dissolver with a toothed disk at 2 m/s, and then are homogenized for homogenization at 5 m/s for 3 minutes.

TABLE 8

(quantities in g)

| Constituents | Example 14 | | Example 15 | |
|---|---|---|---|---|
| | SK.K | SK.L | SK.K | SK.L |
| Epikote 816 MV | 91.5 | | 91.5 | |
| BYK-A 530 | 0.5 | | 0.5 | |
| (a1.1) | 8.0 | | 8.0 | |
| (a2.1) | 4.8 | | 4.8 | |
| Epikure 8545-W-52 | | 140 | | 140 |
| Water | | 60 | | 60 |
| (b1.2) | | 9.6 | | 16 |

Table 9 below shows the performance data for inventive examples 14 and 15:

TABLE 9

| Example | Viscosity* SK.K without (a2.1) | Viscosity* SK.K | Viscosity loss in % | Viscosity* SK.L | Viscosity* SK.K + SK.L | Viscosity increase[1] in % |
|---|---|---|---|---|---|---|
| 14 | 105 | 35.5 | 66 | 3.8 | 44.3 | 25 |
| 15 | 105 | 35.5 | 66 | 5.2 | 65.5 | 85 |

*in pascal-seconds;
[1]relative to SK.K

In the case of aqueous systems of examples 14 and 15 as well it is apparent that component (b1.2) leads to a further increase—albeit a much lower one—in the viscosity of the previously inhibited system.

(a1.x)(a2.x)-(b1.x) Combinations Without Epoxy Resin-Curing Agent Constituents

Described below is a simple "preliminary" test for selecting (a1.x) (a2.x)-(b1.x) combinations having potential suitability. For this test (a1.x) and (a2.x) are introduced in a solvent and then (b1.x) is incorporated in pure form or in solution. The thickening effect is ascertained from the increase in viscosity.

Preparation of the Binder-Free Test Systems

The solvent (PMA=methoxypropyl acetate, benzyl alcohol, styrene or water) and the inorganic thickeners (a1.x) (for amounts see tables) are mixed with the Pendraulik TD 100 dissolver with a toothed disk at 2 m/s and then homogenized by stirring for a further 1 minute at 5 m/s, 1 minute at 10 m/s, and 1 minute at 15 m/s. Subsequently the wetting and dispersing agent (a2.x) (for amounts see tables) is added and homogenization takes place for 1 minute at 10 m/s.

After cooling to room temperature (23° C.), a measurement is made of the viscosity of the system SK.MA, SK.MC, SK.ME, SK.MG and SK.MI, respectively. Thereafter the components SK.MB, SK.MD, SK.MF, SK.MH and SK.MJ, respectively, comprising component (b1.x), are added. This is followed by homogenization for 1 minute at 5 m/s and by measurement of the viscosity after 2 minutes (viscosity after incorporation of (b1.x)).

TABLE 10

(quantity figures in g)

| | Comp. ex. M1 | | Comp. ex. M2 | |
|---|---|---|---|---|
| Constituents | SK.MA | SK.MB | SK.MA | SK.MB |
| PMA | 90.0 | | 90.0 | |
| (a1.1) | 10.0 | | 10.0 | |
| (a2.x) | 0.0 | | 0.0 | |
| Benzyl alcohol | | 0.0 | | 0.0 |
| (b1.1) | | 0.0 | | 2.0 |

TABLE 11

(quantity figures in g)

| Constituents | Ex. M1 SK.MA | Ex. M1 SK.MB | Ex. M2 SK.MA | Ex. M2 SK.MB | Ex. M3 SK.MA | Ex. M3 SK.MB | Ex. M4 SK.MA | Ex. M4 SK.MB | Ex. M5 SK.MA | Ex. M5 SK.MB |
|---|---|---|---|---|---|---|---|---|---|---|
| PMA | 90.0 | | 90.0 | | 90.0 | | 90.0 | | 90.0 | |
| (a1.1) | 10.0 | | 10.0 | | 10.0 | | 10.0 | | 10.0 | |
| (a2.x) | 5.0[1] | | 5.0[1] | | 5.0[2] | | 5.0[2] | | 5.0[2] | |
| Benzyl alcohol | | 0.0 | | 0.0 | | 0.0 | | 98.0 | | 98.0 |
| (b1.x) | | 2.0* | | 1.0** | | 1.0*** | | 2.0* | | 2.0** |

[1] = (a2.1);
[2] = (a2.4);
* = (b1.1);
** = (b1.2);
*** = (b1.3)

TABLE 12

(quantity figures in g)

| Constituents | Ex. M6 SK.MA | Ex. M6 SK.MB | Ex. M7 SK.MA | Ex. M7 SK.MB |
|---|---|---|---|---|
| PMA | 90.0 | | 90.0 | |
| (a1.1) | 10.0 | | 10.0 | |
| (a2.5) | 5.0 | | 5.0 | |
| Benzyl alcohol | | 98.0 | | 98.0 |
| (b1.x) | | 2.0* | | 2.0** |

* = (b1.1);
** = (b1.2)

TABLE 13

(quantity figures in g)

| Constituents | Ex. M8 SK.MC | Ex. M8 SK.MD | Ex. M9 SK.MC | Ex. M9 SK.MD | Ex. M10 SK.MC | Ex. M10 SK.MD |
|---|---|---|---|---|---|---|
| PMA | 87.0 | | 87.0 | | 87.0 | |
| (a1.4) | 13.0 | | 13.0 | | 13.0 | |
| (a2.1) | 5.2 | | 5.2 | | 5.2 | |
| (b1.x) | | 2.6* | | 1.95** | | 1.3*** |

* = (b1.3);
** = (b1.1);
*** = (b1.2)

TABLE 14

(quantity figures in g)

| Constituents | Ex. M11 SK.MC | Ex. M11 SK.MD | Ex. M12 SK.MC | Ex. M12 SK.MD | Ex. M13 SK.MC | Ex. M13 SK.MD |
|---|---|---|---|---|---|---|
| PMA | 87.0 | | 87.0 | | 87.0 | |
| (a1.4) | 13.0 | | 13.0 | | 13.0 | |
| (a2.4) | 5.2 | | 5.2 | | 5.2 | |
| (b1.x) | | 2.6* | | 1.95** | | 1.3*** |

* = (b1.3);
** = (b1.1);
*** = (b1.2)

TABLE 15

(quantity figures in g)

| Constituents | Ex. M14 SK.MC | Ex. M14 SK.MD | Ex. M15 SK.MC | Ex. M15 SK.MD | Ex. M16 SK.MC | Ex. M16 SK.MD |
|---|---|---|---|---|---|---|
| PMA | 87.0 | | 87.0 | | 87.0 | |
| (a1.4) | 13.0 | | 13.0 | | 13.0 | |
| (a2.9) | 5.2 | | 5.2 | | 5.2 | |
| (b1.x) | | 2.6* | | 1.95** | | 1.3*** |

* = (b1.3);
** = (b1.1);
*** = (b1.2)

TABLE 16

(quantity figures in g)

| Constituents | Ex. M17 SK.ME | Ex. M17 SK.MF | Ex. M18 SK.ME | Ex. M18 SK.MF | Ex. M19 SK.ME | Ex. M19 SK.MF |
|---|---|---|---|---|---|---|
| PMA | 85.0 | | 85.0 | | 85.0 | |
| (a1.3) | 15.0 | | 15.0 | | 15.0 | |
| (a2.1) | 6.0 | | 6.0 | | 6.0 | |
| (b1.x) | | 3.0* | | 2.25** | | 1.5*** |

* = (b1.3);
** = (b1.1);
*** = (b1.2)

TABLE 17

(quantity figures in g)

| Constituents | Ex. M20 SK.ME | Ex. M20 SK.MF | Ex. M21 SK.ME | Ex. M21 SK.MF | Ex. M22 SK.ME | Ex. M22 SK.MF |
|---|---|---|---|---|---|---|
| PMA | 85.0 | | 85.0 | | 85.0 | |
| (a1.3) | 15.0 | | 15.0 | | 15.0 | |
| (a2.3) | 6.0 | | 6.0 | | 6.0 | |
| Benzyl alcohol | | 0.0 | | 0.0 | | 98.5 |
| (b1.x) | | 3.0* | | 2.25** | | 1.5*** |

* = (b1.3);
** = (b1.1);
*** = (b1.2)

TABLE 18

(quantity figures in g)

|  | Ex. M23 | | Ex. M24 | | Ex. M25 | |
|---|---|---|---|---|---|---|
| Constituents | SK.ME | SK.MF | SK.ME | SK.MF | SK.ME | SK.MF |
| PMA | 85.0 | | 85.0 | | 85.0 | |
| (a1.3) | 15.0 | | 15.0 | | 15.0 | |
| (a2.8) | 6.0 | | 6.0 | | 6.0 | |
| Benzyl alcohol | | 0.0 | | 0.0 | | 98.5 |
| (b1.x) | | 3.0* | | 2.25** | | 1.5*** |

*= (b1.3);
**= (b1.1);
***= (b1.2)

TABLE 19

(quantity figures in g)

|  | Ex. M26 | | Ex. M27 | | Ex. M28 | |
|---|---|---|---|---|---|---|
| Constituents | SK.MG | SK.MH | SK.MG | SK.MH | SK.MG | SK.MH |
| Styrene | 85.0 | | 85.0 | | 85.0 | |
| (a1.5) | 15.0 | | 15.0 | | 15.0 | |
| (a2.12) | 6.0 | | 6.0 | | 6.0 | |
| (b1.x) | | 3.0* | | 3.0** | | 3.0*** |

*= (b1.3);
**= (b1.7);
***= (b1.10)

TABLE 20

(quantity figures in g)

|  | Ex. M29 | | Ex. M30 | | Ex. M31 | |
|---|---|---|---|---|---|---|
| Constituents | SK.MG | SK.MH | SK.MG | SK.MH | SK.MG | SK.MH |
| Styrene | 85.0 | | 85.0 | | 85.0 | |
| (a1.5) | 15.0 | | 15.0 | | 15.0 | |
| (a2.3) | 6.0 | | 6.0 | | 6.0 | |
| (b1.x) | | 3.0* | | 3.0** | | 3.0*** |

*= (b1.3);
**= (b1.7);
***= (b1.10)

TABLE 21

(quantity figures in g)

|  | Ex. M32 | | Ex. M33 | | Ex. M34 | |
|---|---|---|---|---|---|---|
| Constituents | SK.MG | SK.MH | SK.MG | SK.MH | SK.MG | SK.MH |
| Styrene | 85.0 | | 85.0 | | 85.0 | |
| (a1.5) | 15.0 | | 15.0 | | 15.0 | |
| (a2.9) | 6.0 | | 6.0 | | 6.0 | |
| (b1.x) | | 3.0* | | 3.0** | | 3.0*** |

*= (b1.3);
**= (b1.7);
***= (b1.10)

TABLE 22

(quantity figures in g)

|  | Ex. M35 | | Ex. M36 | |
|---|---|---|---|---|
| Constituents | SK.MI | SK.MJ | SK.MI | SK.MJ |
| Water | 85.0 | | 85.0 | |
| (a1.5) | 15.0 | | 15.0 | |
| (a2.1) | 6.0 | | 6.0 | |
| (b1.6) | | 0.75 | | 3.0 |

TABLE 23

| Comp. ex. | Viscosity* SK.MA without (a2.x) | Viscosity* SK.MA | Viscosity loss in % | Viscosity* SK.MB | Viscosity* SK.MA + SK.MB | Viscosity increase[1] in % |
|---|---|---|---|---|---|---|
| VM1 | 16.7 | ./. | ./. | ./. | ./. | ./. |
| VM2 | 16.7 | ./. | ./. | ./. | 54.8 | ./. |

| Ex. | Viscosity* SK.MA without (a2.x) | Viscosity* SK.MA | Viscosity loss in % | Viscosity* SK.MB | Viscosity* SK.MA + SK.MB | Viscosity increase[1] in % |
|---|---|---|---|---|---|---|
| M1 | 16.7 | 0.44 | 97 | 0.3 | 51.0 | 10 491 |
| M2 | 16.7 | 0.44 | 97 | 0.3 | 46.4 | 10 445 |
| M3 | 16.7 | 0.19 | 99 | 0.3 | 1.8 | 847 |
| M4 | 16.7 | 0.19 | 99 | 0.01 | 8.9 | 4584 |
| M5 | 16.7 | 0.19 | 99 | 0.01 | 31.5 | 16 479 |
| M6 | 16.7 | 1.18 | 93 | 0.01 | 30.6 | 2493 |
| M7 | 16.7 | 1.18 | 93 | 0.01 | 29.2 | 2375 |

| Ex. | Viscosity* SK.MC without (a2.x) | Viscosity* SK.MC | Viscosity loss in % | Viscosity* SK.MD | Viscosity* SK.MC + SK.MD | Viscosity increase[2] in % |
|---|---|---|---|---|---|---|
| M8 | 162 | 10.8 | 93 | 0.3 | 98.7 | 814 |
| M9 | 162 | 10.8 | 93 | 0.3 | 184.1 | 1605 |
| M10 | 162 | 10.8 | 93 | 0.3 | 48.1 | 345 |
| M11 | 162 | 15.7 | 90 | 0.3 | 100.7 | 541 |
| M12 | 162 | 15.7 | 90 | 0.3 | 130.5 | 731 |
| M13 | 162 | 15.7 | 90 | 0.3 | 58.1 | 270 |
| M14 | 162 | 35.1 | 78 | 0.3 | 475.6 | 1255 |
| M15 | 162 | 35.1 | 78 | 0.3 | 488.2 | 1291 |
| M16 | 162 | 35.1 | 78 | 0.3 | 108.9 | 210 |

| Ex. | Viscosity* SK.ME without (a2.x) | Viscosity* SK.ME | Viscosity loss in % | Viscosity* SK.MF | Viscosity* SK.ME + SK.MF | Viscosity increase[3] in % |
|---|---|---|---|---|---|---|
| M17 | 15.1 | 6.7 | 96 | 0.3 | 45.0 | 572 |
| M18 | 15.1 | 6.7 | 96 | 0.3 | 319.2 | 4664 |
| M19 | 15.1 | 6.7 | 96 | 0.3 | 168.0 | 2407 |
| M20 | 15.1 | 35.3 | 80 | 0.3 | 200.3 | 467 |
| M21 | 15.1 | 35.3 | 80 | 0.3 | 754.3 | 2037 |
| M22 | 15.1 | 35.3 | 80 | 0.01 | 419.9 | 1090 |
| M23 | 15.1 | 4.3 | 98 | 0.3 | 5.1 | 19 |
| M24 | 15.1 | 4.3 | 98 | 0.3 | 21.4 | 398 |
| M25 | 15.1 | 4.3 | 98 | 0.01 | 113.5 | 2540 |

| Ex. | Viscosity* SK.MG without (a2.x) | Viscosity* SK.MG | Viscosity loss in % | Viscosity* SK.MH | Viscosity* SK.MG + SK.MH | Viscosity increase[4] in % |
|---|---|---|---|---|---|---|
| M26 | 30.8 | 16.7 | 46 | 0.3 | 163.4 | 878 |
| M27 | 30.8 | 16.7 | 46 | 0.3 | 68.4 | 310 |
| M28 | 30.8 | 16.7 | 46 | 0.3 | 516.6 | 2993 |
| M29 | 30.8 | 1.0 | 97 | 0.3 | 179.3 | 17 830 |
| M30 | 30.8 | 1.0 | 97 | 0.3 | 18.5 | 1750 |
| M31 | 30.8 | 1.0 | 97 | 0.3 | 301.8 | 30 080 |
| M32 | 30.8 | 8.1 | 74 | 0.3 | 942.1 | 11 531 |

TABLE 23-continued

| Ex. | Viscosity* SK.MI without (a2.x) | Viscosity* SK.MI | Viscosity loss in % | Viscosity* SK.MJ | Viscosity* SK.MI + SK.MJ | Viscosity increase[5] in % |
|---|---|---|---|---|---|---|
| M33 | 30.8 | 8.1 | 74 | 0.3 | 603.3 | 7348 |
| M34 | 30.8 | 8.1 | 74 | 0.3 | 1037.0 | 12 702 |
| M35 | 442 | 22.1 | 95 | 1.8 | 34.4 | 56 |
| M36 | 442 | 22.1 | 95 | 1.8 | 217.7 | 885 |

*in pascal-seconds;
[1]relative to SK.MA;
[2]relative to SK.MC;
[3]relative to SK.ME;
[4]relative to SK.MG;
[5]relative to SK.MI

The invention claimed is:

1. An adhesive, sealant, a coating material or a molding compound obtained from a two-component or multicomponent system comprising
   at least one epoxy resin component 1 which comprises
   i. at least one epoxy resin,
   ii. at least one inorganic thickener (a1), and
   iii. at least one wetting and dispersing agent (a2) which inhibits the thickening effect of the inorganic thickener (a1);
with
   a curing agent component 2 which comprises
   i.) at least one component (b1) which at least partly eliminates the inhibition of the thickening effect of the inorganic thickener (a1);
   the wetting and dispersing agent (a2) being nonreactive toward the at least one epoxy resin and the curing agent component 2 being reactive toward the epoxy resin component 1;
   wherein the at least one component (b1) is a polymer;
   wherein in the resulting mixture of the epoxy resin component 1 and the curing agent component 2 the weight ratio of wetting and dispersing agent (a2) to component (b1) is 15:1 to 1:5;
   wherein the curing agent component 2 comprises a curing agent different from and in addition to the at least one component (b1), said curing agent employed substantially stoichiometrically relative to the at least one epoxy resin; and
   wherein the at least one epoxy resin component 1 and the curing agent component 2 of the two-component or multicomponent system represent two spatially separate individual components stored separately before mixing.

2. The adhesive, sealant, a coating material or a molding compound obtained from a two-component or multicomponent system as claimed in claim 1, the inorganic thickener (a1) being selected from the group consisting of phyllosilicates, precipitated silicas, and fumed silicas.

3. The adhesive, sealant, a coating material or a molding compound obtained from a two-component or multicomponent system as claimed in claim 1, the inorganic thickener (a1) being non-organically modified fumed silica or hydrophobically modified fumed silica.

4. The adhesive, sealant, a coating material or a molding compound obtained from a two-component or multicomponent system as claimed in claim 1, the inorganic thickener (a1) being a phyllosilicate mixture which has been surface-treated with quaternary alkylammonium salts and which comprises 50 to 95 wt %, based on the phyllosilicate mixture, of a clay mineral selected from the group consisting of sepiolite and palygorskite or mixtures thereof and less than 50 wt %, based on the phyllosilicate mixture, of at least one smectite.

5. The adhesive, sealant, a coating material or a molding compound obtained from a two-component or multicomponent system as claimed in claim 1, the epoxy resin of the epoxy resin component 1 being selected from the group of glycidyl ethers, glycidyl esters, glycidyl amines, cycloaliphatic epoxides, and glycidyl isocyanurates.

6. The adhesive, sealant, a coating material or a molding compound obtained from a two-component or multicomponent system as claimed in claim 1, the curing agent component 2 comprising a curing agent which is selected from the group consisting of diamines, polyamines, polyamides, and cyclic carboxylic anhydrides.

7. The adhesive, sealant, a coating material or a molding compound obtained from a two-component or multicomponent system as claimed in claim 1, the wetting and dispersing agent (a2) and the component (b1) being selected such that they comprise one or more of the following functional groups selected from
   group 1: consisting of
      imidazolyl groups, with the structural element N—C=N,
      amino groups with the structural elements N for tertiary amines, NH for secondary amines, and $NH_2$ for primary amines, and
      ammonium groups with the structural element $NH^+X^-$ for ammonium salts of tertiary amines, with the structural element $NH_2^+X^-$ for ammonium salts of secondary amines, and $NH_3^+X^-$ for ammonium salts of primary amines, $X^-$ in each case being the anion of an acid;
   and/or
   group 2: consisting of
      hydroxyl groups with the structural element OH,
      urea groups with the structural element HNC(O)CNH for ureas of primary amines and NC(O)CN for ureas of secondary amines,
      amide groups, with the structural element C(O)N for amides of secondary amines, C(O)NH for amides of primary amines, and $C(O)NH_2$ for amides of ammonia,
      carboxylic acid groups with the structural element COOH, and
      organic phosphoric ester groups with the structural element $OP(O)(OH)_2$,
   and
   (A) the weight percentage fraction of structural elements in the wetting and dispersing agent (a2), selected from the functional groups of groups 1 and 2, based on the weight of the wetting and dispersing agent (a2), being lower than the weight percentage fraction of structural elements in component (b1), selected from the functional groups of groups 1 and 2, based on the weight of the component (b1);
   and/or
   (B) component (b1) comprising a higher weight percentage fraction of structural elements from the functional groups selected from group 1, based on the weight of component (b1), than that of the structural elements from the functional groups selected from group 1 in the wetting and dispersing agent (a2), based on the weight of the wetting and dispersing agent (a2).

8. The adhesive, sealant, a coating material or a molding compound obtained from a two-component or multicomponent system as claimed in claim 7,
(A) the weight percentage fraction of structural elements selected from the functional groups of groups 1 and 2, based on the weight of the wetting and dispersing agent (a2), being less than 11 wt %, and
the weight percentage fraction of structural elements selected from the functional groups of groups 1 and 2, based on the weight of component (b1), being greater than or equal to 11 wt %.

9. The adhesive, sealant, a coating material or a molding compound obtained from a two-component or multicomponent system as claimed in claim 7, the difference in the weight percentage fractions of the structural elements between the wetting and dispersing agent (a2) and component (b1), in case (A) and/or in case (B), being at least 2 wt %.

10. The adhesive, sealant, a coating material or a molding compound obtained from a two-component or multicomponent system as claimed in claim 1, the wetting and dispersing agent (a2) binding reversibly to the surface of the inorganic thickener (a1).

11. The adhesive, sealant, a coating material or a molding compound obtained from a two-component or multicomponent system as claimed in claim 1, wherein the component (b1) is a polymer and is able to bind to the surface of the inorganic thickener (a1) with at least partial displacement of (a2).

12. A substrate coated with the adhesive, sealant, or coating material obtained from a two-component or multi-component system of claim 1.

* * * * *